US012676734B2

(12) United States Patent
Movva et al.

(10) Patent No.: US 12,676,734 B2
(45) Date of Patent: Jul. 7, 2026

(54) SERVER-MEDIATED MANAGEMENT OF ACCESSORY DEVICE SHARING

(71) Applicant: Apple Inc., Cupertino, CA (US)

(72) Inventors: Siva Ganesh Movva, San Jose, CA (US); Emmanuel Lalande, Lachine (CA); Michael C. Laster, Santa Clara, CA (US); Sarish Jain, Mumbai (IN); Stephen M. Polansky, South Lake Tahoe, CA (US); Karthikeyan Pattabiraman, Belmont, CA (US); Swadesh Bhattacharya, Sunnyvale, CA (US); Raghunandan K. Pai, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 18/646,601

(22) Filed: Apr. 25, 2024

(65) Prior Publication Data

US 2024/0380575 A1 Nov. 14, 2024

Related U.S. Application Data

(60) Provisional application No. 63/552,619, filed on Feb. 12, 2024, provisional application No. 63/501,083, filed on May 9, 2023.

(51) Int. Cl.
*H04L 29/06* (2006.01)
*G06F 21/62* (2013.01)
*H04L 9/08* (2006.01)

(52) U.S. Cl.
CPC ........ *H04L 9/0825* (2013.01); *G06F 21/6209* (2013.01); *H04L 9/085* (2013.01); *G06F 2221/2141* (2013.01)

(58) Field of Classification Search
None
See application file for complete search history.

(56) References Cited

U.S. PATENT DOCUMENTS 7,224,987 B1 5/2007 Bhela et al.
8,224,355 B2 7/2012 Beydler et al.
(Continued)

OTHER PUBLICATIONS

PCT/US2024/015446, "PCT Notification of Transmittal of the International Search Report and the Written Opinion on the International Searching Authority, or the Declaration", mailed Jun. 10, 2024, 11 pages.

(Continued)

*Primary Examiner* — Andrew J Steinle
(74) *Attorney, Agent, or Firm* — Kilpatrick Townsend & Stockton LLP

(57) ABSTRACT

Methods, non-transitory machine-readable mediums, and system to provide that a delegate server receives authentication credentials from a first sharee electronic device, determines at least one cryptographic key and metadata accessible to a first sharee corresponding to the received authentication credentials, the metadata defines a set of conditions for a share of location information for an accessory device, evaluates the metadata to determine if the set of conditions are satisfied, upon determination that the set of conditions are satisfied, sends the metadata and the at least one cryptographic key to the first sharee electronic device, receives an indication that a second sharee electronic device is joining the share of location information for the accessory device, and sends at least one update for the cryptographic key and the metadata.

16 Claims, 26 Drawing Sheets

(56)            References Cited

U.S. PATENT DOCUMENTS

| | | | |
|---|---|---|---|
| 8,499,337 | B1 | 7/2013 | Kenny et al. |
| 9,009,794 | B2 | 4/2015 | Dykeman et al. |
| 9,439,056 | B2 | 9/2016 | Chukka et al. |
| 9,443,366 | B2 | 9/2016 | Rayner |
| 9,961,507 | B1 | 5/2018 | Mendelson |
| 11,107,088 | B2 | 8/2021 | Radocchia et al. |
| 11,202,168 | B2 | 12/2021 | Evans et al. |
| 11,288,562 | B2 | 3/2022 | Purba |
| 11,356,799 | B2 | 6/2022 | Haney |
| 11,622,237 | B2 | 4/2023 | Diem |
| 2013/0104035 | A1 | 4/2013 | Wagner et al. |
| 2022/0021684 | A1 | 1/2022 | Mensah et al. |
| 2022/0200789 | A1* | 6/2022 | Lalande ............... H04W 12/50 |
| 2022/0377562 | A1* | 11/2022 | de la Broise ........... H04L 9/083 |
| 2022/0394660 | A1 | 12/2022 | Werner et al. |

OTHER PUBLICATIONS

PCT/US2024/028180, "PCT Notification of Transmittal of the International Search Report and the Written Opinion on the International Searching Authority, or the Declaration", mailed Aug. 5, 2024, 18 pages.

International Application No. PCT/US2024/028180 , International Preliminary Report on Patentability, Mailed on Nov. 20, 2025, 14 pages.

* cited by examiner

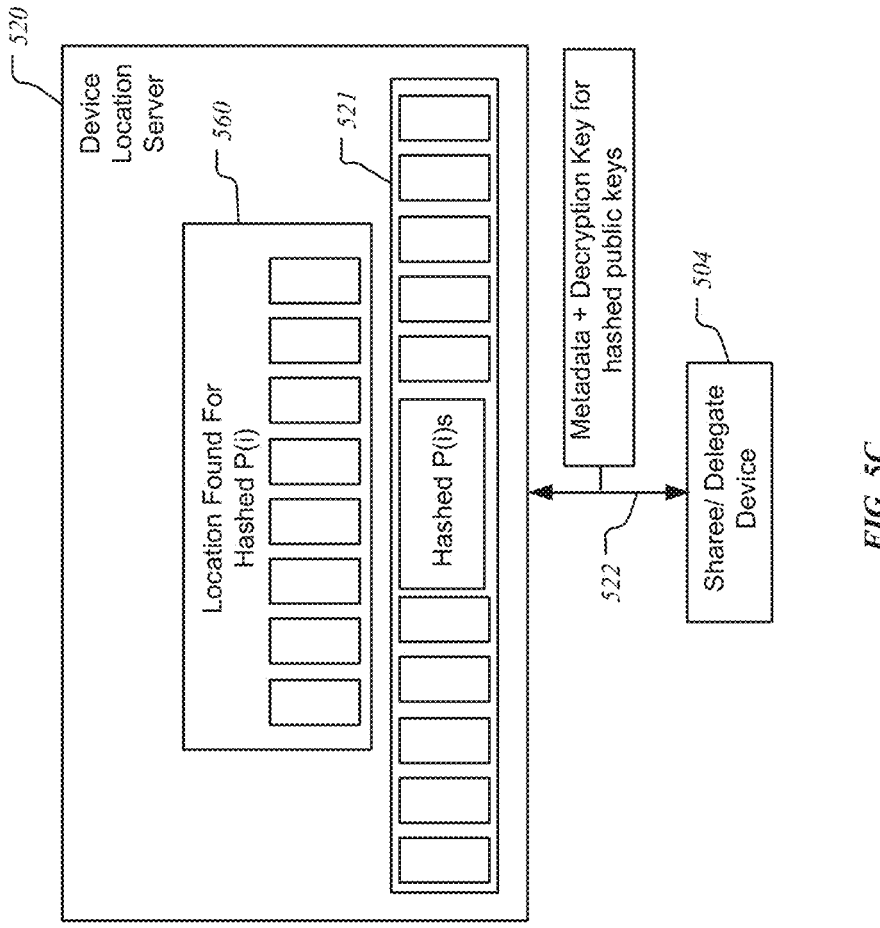
*FIG. 5C*

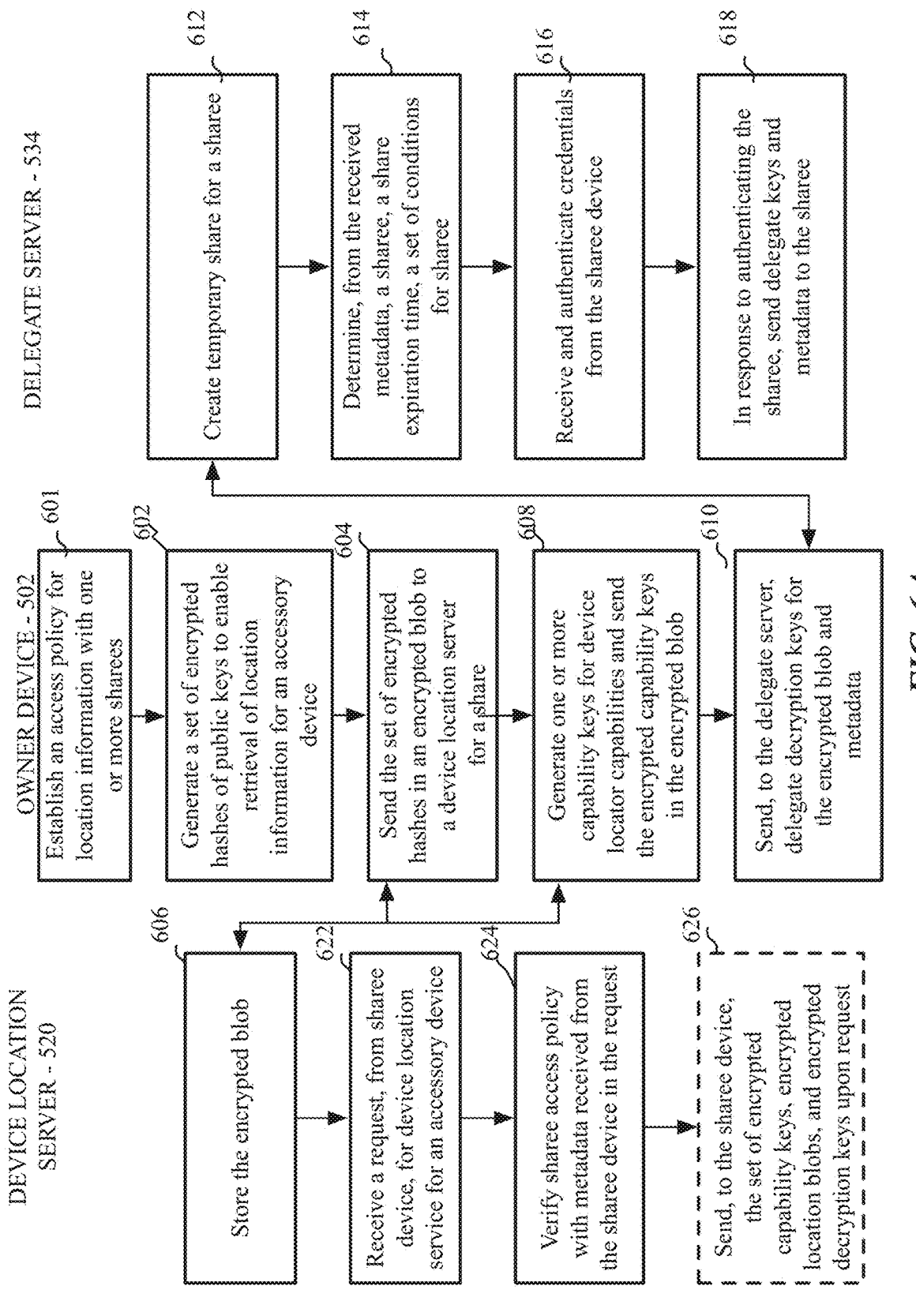

DELEGATE SERVER - 534

612 Create temporary share for a sharee

614 Determine, from the received metadata, a sharee, a share expiration time, a set of conditions for sharee 616 Receive and authenticate credentials from the sharee device 618 In response to authenticating the sharee, send delegate keys and metadata to the sharee

OWNER DEVICE - 502

601 Establish an access policy for location information with one or more sharees 602 Generate a set of encrypted hashes of public keys to enable retrieval of location information for an accessory device 604 Send the set of encrypted hashes in an encrypted blob to a device location server for a share 608 Generate one or more capability keys for device locator capabilities and send the encrypted capability keys in the encrypted blob 610 Send, to the delegate server, delegate decryption keys for the encrypted blob and metadata

DEVICE LOCATION SERVER - 520

606 Store the encrypted blob

622 Receive a request, from sharee device, for device location service for an accessory device 624 Verify sharee access policy with metadata received from the sharee device in the request 626 Send, to the sharee device, the set of encrypted capability keys, encrypted location blobs, and encrypted decryption keys upon request

*FIG. 6A*

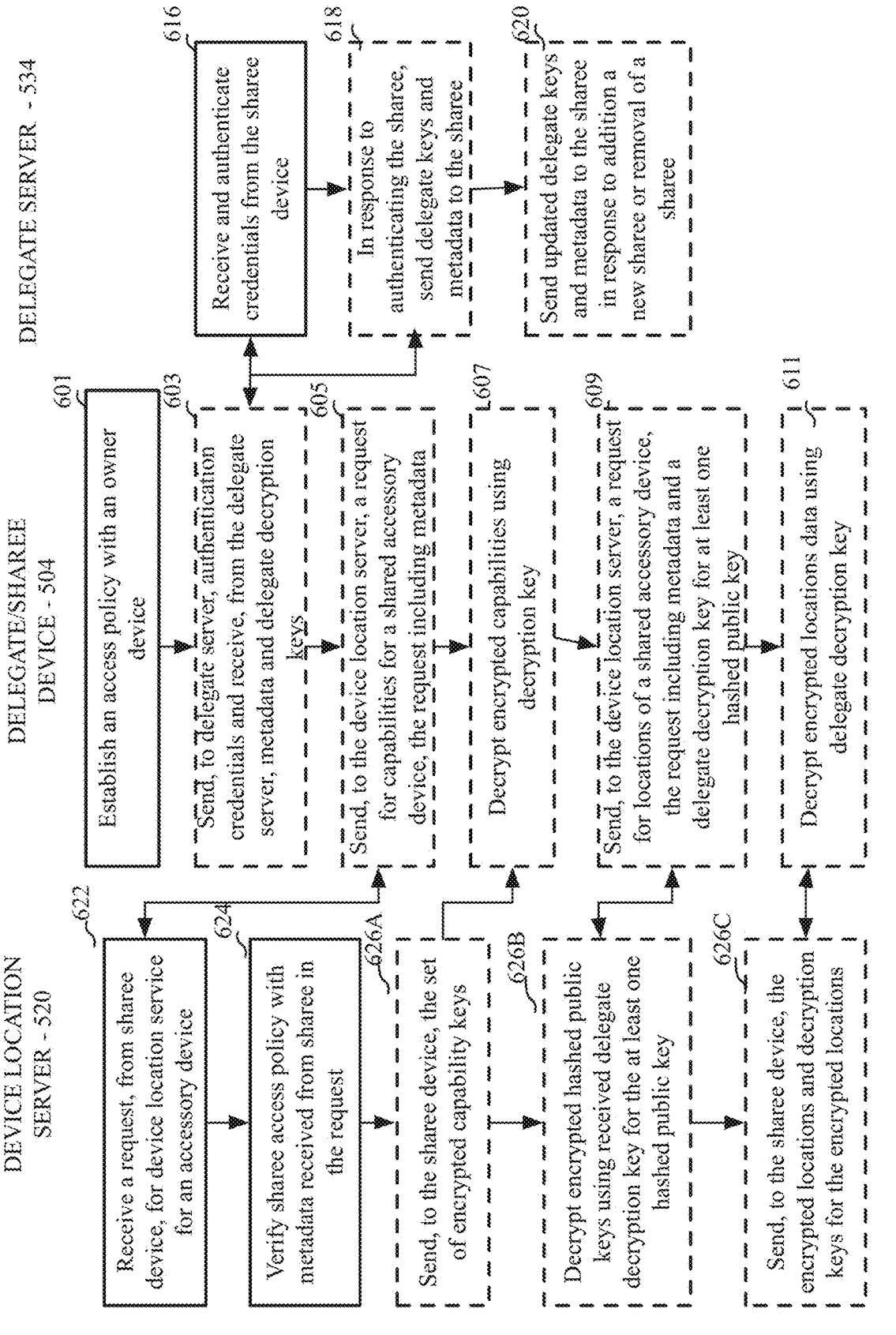

*FIG. 6B*

DELEGATE SERVER - 534

Receive and authenticate credentials from the sharee device — 616

In response to authenticating the sharee, send delegate keys and metadata to the sharee — 618

Send updated delegate keys and metadata to the sharee in response to addition a new sharee or removal of a sharee — 620

DELEGATE/SHAREE DEVICE - 504

Establish an access policy with an owner device — 601

Send, to delegate server, authentication credentials and receive, from the delegate server, metadata and delegate decryption keys — 603

Send, to the device location server, a request for capabilities for a shared accessory device, the request including metadata — 605

Decrypt encrypted capabilities using decryption key — 607

Send, to the device location server, a request for locations of a shared accessory device, the request including metadata and a delegate decryption key for at least one hashed public key — 609

Decrypt encrypted locations data using delegate decryption key — 611

DEVICE LOCATION SERVER - 520

Receive a request, from sharee device, for device location service for an accessory device — 622

Verify sharee access policy with metadata received from sharee in the request — 624

Send, to the sharee device, the set of encrypted capability keys — 626A

Decrypt encrypted hashed public keys using received delegate decryption key for the at least one hashed public key — 626B Send, to the sharee device, the encrypted locations and decryption keys for the encrypted locations — 626C

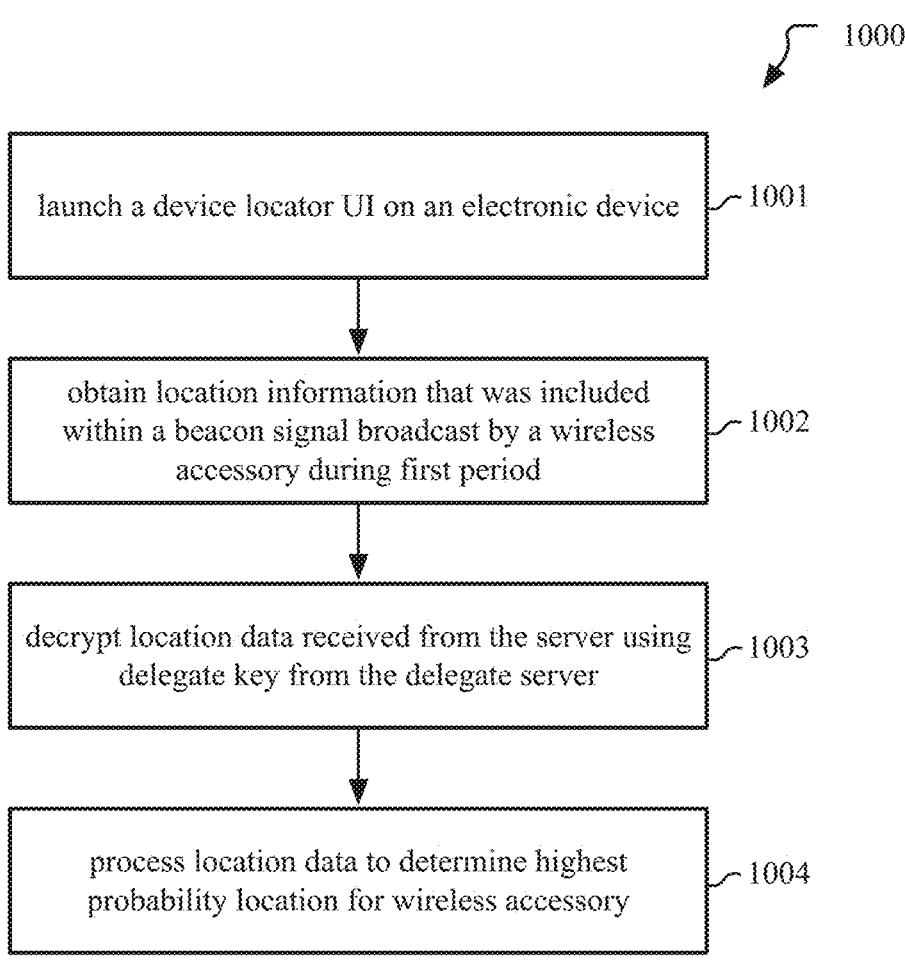

1000 launch a device locator UI on an electronic device   ⌐ 1001 obtain location information that was included within a beacon signal broadcast by a wireless accessory during first period   ⌐ 1002 decrypt location data received from the server using delegate key from the delegate server   ⌐ 1003 process location data to determine highest probability location for wireless accessory   ⌐ 1004

*FIG. 10*

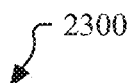
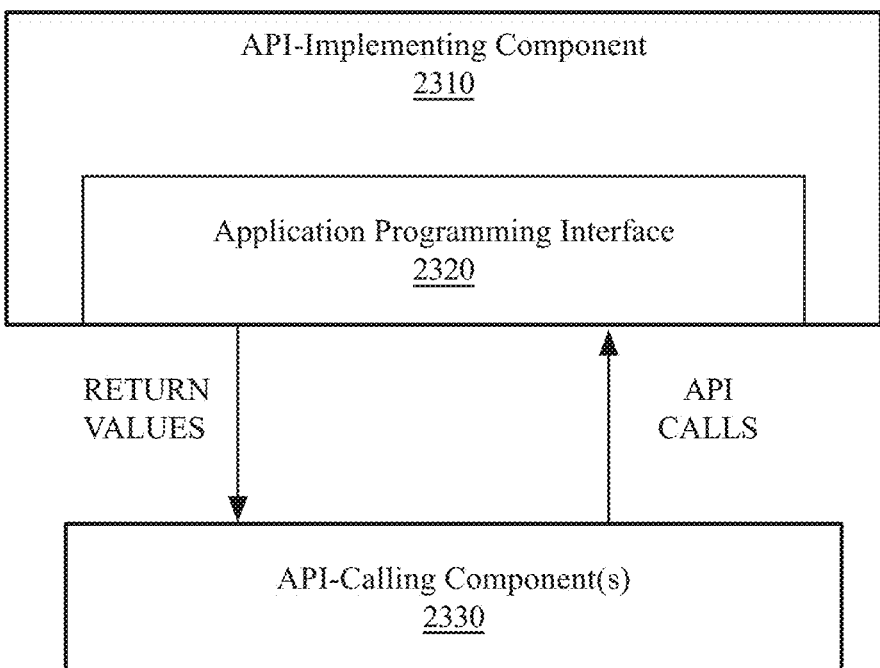
*Fig.13*

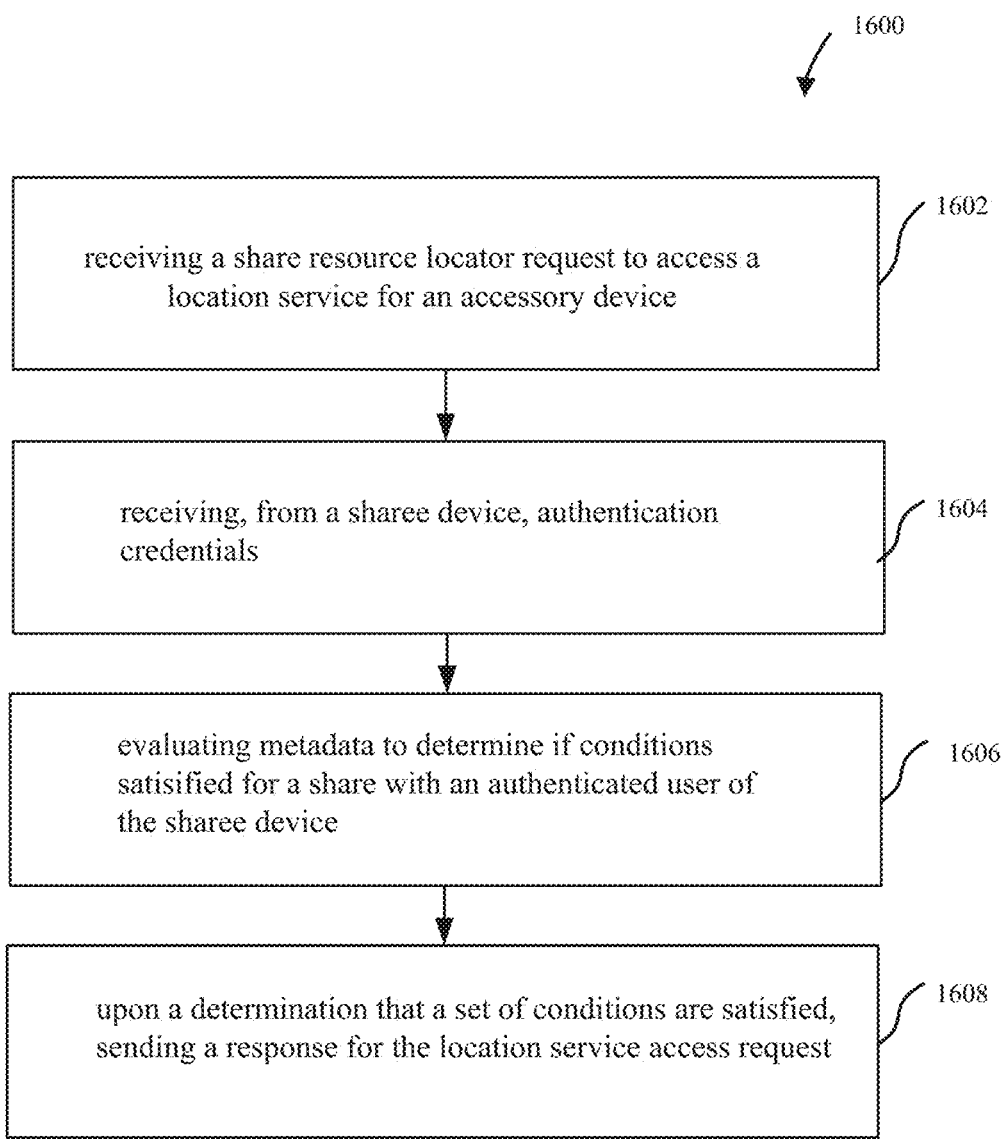

1600 receiving a share resource locator request to access a location service for an accessory device

1602 receiving, from a sharee device, authentication credentials

1604 evaluating metadata to determine if conditions satisified for a share with an authenticated user of the sharee device

1606 upon a determination that a set of conditions are satisfied, sending a response for the location service access request

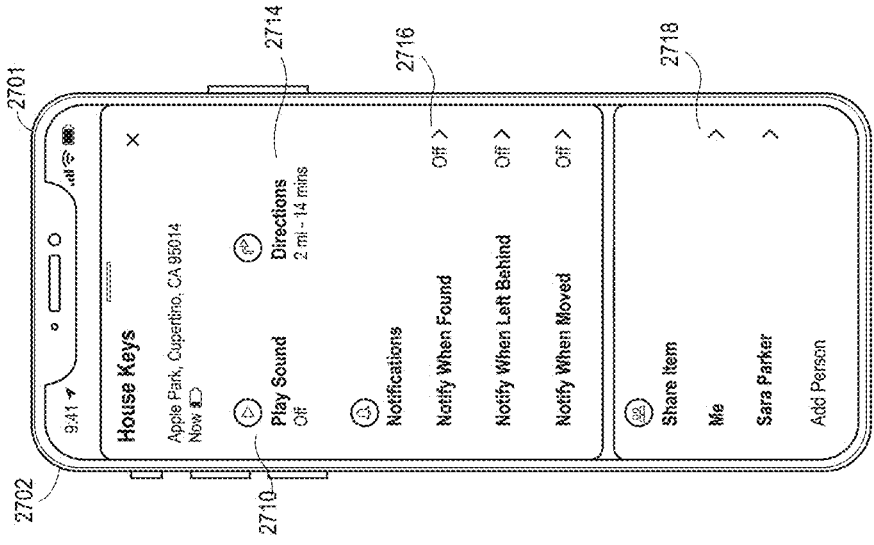
*Fig. 19B*
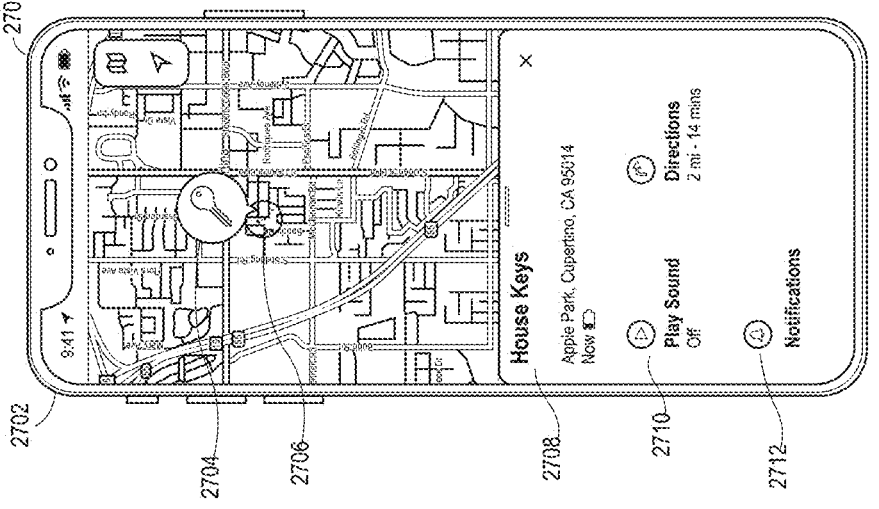
*Fig. 19A*

SERVER-MEDIATED MANAGEMENT OF ACCESSORY DEVICE SHARING

This application claims the benefit of priority of U.S. Provisional Application No. 63/501,083, entitled "Server-Mediated Management of Accessory Device Sharing," filed May 9, 2023, and U.S. Provisional Application No. 63/552, 619, entitled "Server-Mediated Management of Accessory Device Sharing," filed Feb. 12, 2024, each of which is herein incorporated by reference.

FIELD

Embodiments described herein relate to location services for accessory devices.

BACKGROUND INFORMATION

Previous solutions for device locator services for shared accessory devices transferred encryption keys between an owner device and a sharee device thereby permitting the sharee device to use the encryption keys to access location information for the accessory device as if a sharee was an owner. The provision of the owner encryption keys directly with the sharee makes limiting access to location information challenging. Thus, a solution for sharing accessory device location information that limits access to locator services by the sharee is desirable.

SUMMARY

Embodiments described herein provide for a system, a non-transitory machine-readable medium, and methods to provide location services. An embodiment provides receiving, at a delegate server, authentication credentials are received from a first sharee electronic device, determining at least one cryptographic key and metadata accessible to a first sharee corresponding to the received authentication credentials, where the metadata defines a set of conditions for a share of location information for an accessory device, evaluating the metadata to determine if the set of conditions are satisfied, upon determination that the set of conditions are satisfied, sending the metadata and the at least one cryptographic key to the first sharee electronic device, receiving an indication that a second sharee electronic device is joining the share of location information for the accessory device, and sending at least one update for the cryptographic key and the metadata.

Embodiments provide metadata including an access policy for access to location information for the accessory device by the first sharee. Embodiments further provide an access policy including conditions for the first sharee on access to obtaining location information provided to a device location service by the second sharee established upon acceptance of the share by the first sharee and the second sharee. Embodiments further provide metadata including an account identifier for the first sharee and a duration of time for the share.

An embodiment provides receiving, at a device locations server, a location services request from a sharee electronic device for an accessory device, decrypting an encrypted blob with at least one cryptographic key included with the location services request, where the encrypted blob received from an owner device for a requested share of location information for the accessory device, retrieving encrypted location information for the accessory device from a location information database with the at least one hashed public key obtained from the decrypted encryption blob, and sending, to the sharee electronic device, the retrieved encrypted location information and an encrypted cryptographic key for the encrypted location information in response to the location services request. Embodiments provide verifying an access policy for a sharee corresponding to metadata included with the location services request, the access policy defining a set of conditions for a share of location information for the accessory device, evaluating metadata to determine if the set of conditions are satisfied for the sharee, and upon determination that the set of conditions are satisfied, decrypting an encryption blob with the at least one cryptographic key included with the location services request.

Embodiments further provide decrypting an encrypted blob with at least one cryptographic key included with the location services request, and sending a cryptographic key for at least one device location service capability for the accessory device. Embodiments provide the at least one hashed public key corresponds to a public key generated with a shared secret at both the owner device and the wireless accessory. Embodiments further provide the location information comprises location information provided to the device location server by a second sharee device that detected a beacon from the wireless accessory.

An embodiment provides receiving an acceptance of a request for a share of access to location information for a paired accessory device, generating a set of hashed public keys corresponding to a set of public keys expected to encrypt received location information for the accessory device by a device location services server during the duration of the share, encrypting and sending the set of hashed public keys to the device location services server, and sending, to a delegate server, a cryptographic key to decrypt the set of hashed public keys and metadata, wherein the metadata comprises an identifier for a first sharee and a set of conditions for the share. Embodiments further provide establishing a shared secret with the paired accessory device, and generating a public key in the set of public keys based on the shared secret and a timestamp expected during the duration of the share. Embodiments further provide the metadata comprises an access policy for access to location information. Embodiments further provide sending, to the device location services server, an encrypted blob, where the encrypted blob comprises encrypted cryptographic keys that authorize the first sharee to access a location service for the accessory device, and sending, to the delegate server, a decryption key for the encrypted blob. Embodiments further provide receiving, from the first sharee device, an affirmative response to a request to include a second sharee in the share for the accessory device, and sending updated cryptographic keys and metadata for each sharee in the share. An embodiment provides sending an affirmative response to a request to share access to location information for an accessory device in accordance with an access policy, the accessory device paired to an owner device, receiving, from a delegate server, metadata and at least one cryptographic key, the metadata comprising the access policy, sending, to a device location server, a request to perform a look up of location information for the accessory device with the at least one cryptographic key, the request comprising the metadata, and receiving encrypted location information and an encrypted cryptographic key for the encrypted location information for the accessory device in accordance with the access policy. Embodiments further provide the access policy comprises conditions on access to obtaining location information provided to a device location service by the second sharee established upon acceptance of the share by the second sharee.

BRIEF DESCRIPTION OF THE DRAWINGS

FIG. 5C is a network operating environment for electronic devices, according to an embodiment.

FIG. 6A is a flow diagram illustrating a method for use with device locator systems, according to an embodiment.

FIG. 6B is a flow diagram illustrating a method for use with device locator systems, according to an embodiment.

FIG. 10 is a flow diagram illustrating a method for use with device locator systems, according to an embodiment.

FIGS. 11B-12 are user interfaces for the device locator services, according to some embodiments.

FIG. 13 is a block diagram illustrating an exemplary API architecture, which may be used in some embodiments.

FIG. 16 is a flow diagram illustrating a method for use with device locator systems, according to an embodiment.

FIGS. 19A-19B illustrate delegation user interfaces, according to some embodiments.

DETAILED DESCRIPTION

Figure 1:
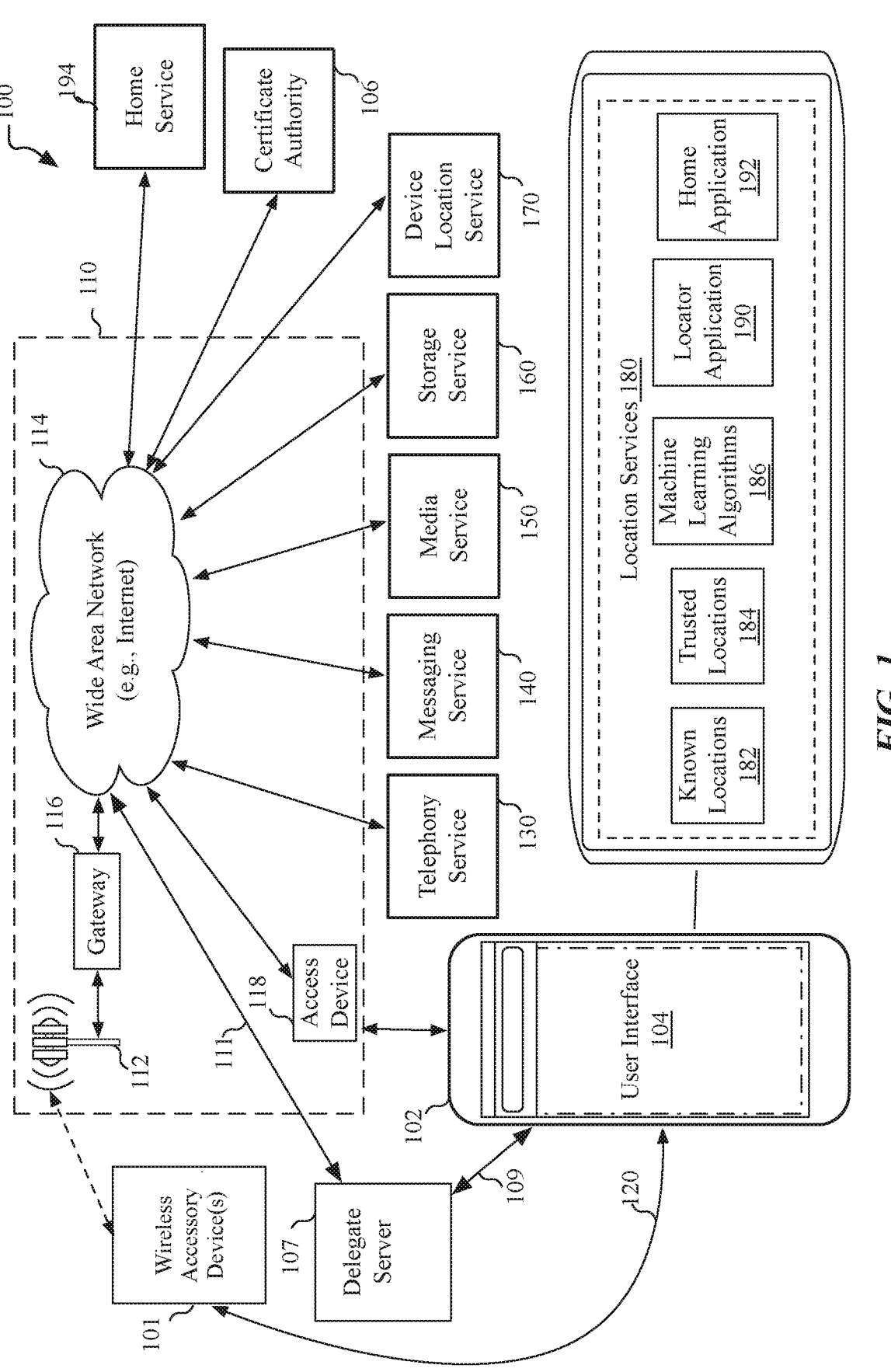
FIG. 1 is a block diagram of a network operating environment for electronic devices, according to an embodiment.

Embodiments described herein generally provide techniques for delegation of one or more location services for an accessory device by a device owner to a sharee. The device owner may have a mobile device that is paired to the accessory device, such as a locator tag, and the device owner may have a set of location services provided upon request via a device location server and/or the accessory device that can be delegated to the sharee. The location services are a set of capabilities for tracking and locating the accessory device. For example, the set of capabilities may include, but are not limited to, the following: location finding services for the accessory device accessible via a user interface, requesting notifications of accessory device location information, requesting to play sound on the accessory device, requesting to share location services for the accessory device with another sharee, ability to request to mute unwanted tracking notifications, and/or any other capability related to the accessory device.

A combination of servers may be used to provide server-mediated management for sharing of location services for the accessory device. For example, the combination of servers may include a first delegate server to deliver delegate cryptographic keys (e.g., encryption/decryption keys) and a second location services server to handle service location requests from the sharee device in a manner that provides limits for access to location services by the sharee, such as with time bound limits on access to location services for the accessory device. A cryptographic key is a string of data that is used to lock or unlock cryptographic functions, including authentication, authorization to perform location services capabilities, and encryption/decryption of data. In some embodiments, the cryptographic key may be part of a public/private key pair. Those with skill in the art will recognize any type of cryptographic keys may be used including symmetric and asymmetric encryption keys.

A first type of delegate key provided to the sharee is a decryption key that allows the sharee to decrypt encrypted blobs (e.g., encrypted capability key blobs, encrypted location blobs, etc.) received by the sharee device from the location services server. For example, the device locator server may send an encrypted blob with an encrypted device locator capability key and the sharee device may decrypt the encrypted blob to access the capability key. The capability key can be sent in a request by the sharee to the device location server authorizing the sharee to access a device locator service corresponding to the capability key. In another example, the device locator server may send an encrypted blob with encrypted location information and the corresponding decryption key(s) for the encrypted location information. Continuing with the example, the received encrypted blob may be decrypted by the sharee device with the first type of delegate key to obtain both the decryption keys for the encrypted location information and the sharee device can decrypt the location information with the obtained decryption keys.

A second type of delegate key is a cryptographic key (e.g., a decryption key) that can be sent by the sharee in a request for on-demand decryption of encrypted blobs at the device location server on behalf of the sharee. The second type of delegate key allows the sharee to access location services for the accessory device using cryptographic keys generated and/or accessible by the owner device. With the provision of the encrypted cryptographic keys (e.g., encrypted hashes of public keys) by the owner device to the device location server and delegate decryption keys, the owner device is able to give access to the sharee device to location information and maintain control over access to the cryptographic keys that are generated based on shared secrets between the accessory device and the owner device. In an embodiment, the encrypted blob stored at the device location server contains public keys or hashes of public keys generated by the owner device and stored at the device location server to access location information for the wireless accessory device. For example, the underlying public keys of the hashed public keys stored in the encrypted blob may be a set of rolling public keys generated at both the owner device and the accessory device based on a shared secret. Continuing with the example, the sharee device may request location information and provide a decryption key for the encrypted public hashes thereby allowing the device location server to look up location information with public key hashes provided by the owner device on behalf of the sharee. The set of encrypted public key hashes can be accessible when the owner device is offline and the owner may limit access to future location information for the accessory device by not directly providing a public key based on a shared secret to the sharee.

The location services server may ensure that the sharee satisfies a set of conditions in order to access each device locator service and will service the device locator requests from the sharee based on conditions defined by the accessory device owner in metadata provided by the delegate server. Metadata provided by the delegate server to the sharee device may define the set of conditions for the share, including, but not limited to the following: sharee identifier, duration of the share (e.g., a defined period of time), other sharees that have permitted access to their respective location information when in the presence of the accessory device, etc. In another example, the combination of servers may facilitate management of access to location information of the accessory device to limit sharing location information when the accessory device is near an owner device or another sharee device.

In some embodiments, the device owner may select an external entity to serve as a sharee/delegate entity for the defined period of time for the share and the device owner may grant the entity access to a subset of device locator services for the accessory device to enable the delegate entity to track and locate the accessory device. A delegate device or sub-delegate device or sharee device may be used interchangeably throughout the specification. Those with skill in the art will recognize that delegate and sub-delegate devices are variants of a sharee device. The external entity is an entity that is a third party to the device locator service provider and the device owner. For example, the external entity may be a service that is entrusted with an item associated with the accessory device or otherwise obliged to provide services to the device owner in regard to the accessory device itself and/or the item associated with the accessory device. Alternatively, the item may be the accessory device, such as APPLE AirPods, that may have been left at a location owned by the external entity.

In some embodiments, metadata on the owner device related to an event with the delegate entity may be used to automatically establish the defined period of time that the external serves as a delegate entity and/or automatically select the subset of device locator services accessible to the delegate entity. For example, metadata on-device of the device owner for an event with an external entity selected as the delegate entity, such as calendar data for the event, may be used to determine the defined period of time and the set of locator services to allow the entity to access. The delegate entity may have sub-delegates (e.g., a set of employees/agents with employee/agent roles) using delegate/sharee devices that are permitted to use the subset of locator services delegated to the delegate entity. The employee of the delegate entity may use the delegate/sharee device to authenticate with a delegate server.

FIG. 1 is a block diagram of a network operating environment 100 for electronic devices, according to an embodiment. The network operating environment 100 includes multiple electronic devices, such as accessory device(s) 101, a delegate server 107, and a mobile device 102. Accessory device(s) 101 may be paired to mobile device 102. In an embodiment, the accessory device may itself be a tracking device, such as an Apple AirTag®. In another embodiment, mobile accessory device 101 may be a single device or a set of accessory devices. For example, the mobile accessory device 101 may be a smartphone or Apple AirPods® that have been lost. The set of accessory devices may be paired to the mobile device 102 and the set of accessory devices may form a device group. Optionally, the device group with accessory devices 101 may be a case with a wired connection to the accessory devices 101 stored within. The case itself may also be an accessory device 101 that may be paired with mobile device 102 in some embodiments. By way of example, accessory device 101 may be collectively sets of devices, such as Apple AirPods® or EarPods®.

In some embodiments, accessory device 101 may not be able to communicate over a wide area network. In other embodiments, devices 101 and 102 can each be an electronic device capable of communicating over a wireless network. Some example mobile electronic devices include but are not limited to the following: a smartphone, a tablet computer, a notebook computer, a wearable computer (e.g., smartwatch or other wearable computing accessory), a mobile media player, a personal digital assistant, AirPods®, EarPods®, AirTag®, locator tags, headphones, head mounted display, health equipment, a speaker, and other similar devices.

Delegate server 107 may be implemented as a set of one or more servers servicing requests from mobile device 102 over wired or wireless networks (as shown with 109 and 111). The device owner may use mobile device 102 to select an identifier for a sharee and create a share record for the sharee stored in a share database associated with the delegate server 107. The mobile device 102 generates a set of delegate keys expected to be used for the duration of the defined period of time for the share. In an embodiment, the delegate server 107 is a key escrow that holds the decryption keys necessary to decrypt data sent between the device owner and the sharee device via the device locator server. In another embodiment, the delegate server 107 holds decryption keys that permit the sharee device to request location services that require decryption of encrypted blobs at the device locator server (as shown with device locator service 170). Electronic devices 102 and sharee devices may use an application programming interface to access locator services 170.

Electronic devices 101, 102 and delegate server 107 can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102 can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102 can place and receive phone calls, send and receive e-mail messages, and retrieve electronic documents over the access device 118 and the wide area network 114. In some implementations, mobile device 101 and/or mobile device 102 can be physically connected to the access device 118 using one or more cables, for example, where the access device 118 is a personal computer. In this configuration, mobile device 101 or mobile device 102 can be referred to as a "tethered" device. In one embodiment, mobile device 101 can communicate with mobile device 102 and/or smart home device via a wireless peer-to-peer connection 120. The wireless peer-to-peer connection 120 can be used to synchronize data between the devices.

Electronic devices 101 and 102 can communicate with one or more services, such as a telephony service 130, a messaging service 140, a media service 150, a storage service 160, a device locator service 170, certificate authority 106, delegate server 107, and home service 194 over the one or more wired and/or wireless networks 110. For example, the telephony service 130 can enable telephonic communication between mobile devices or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 101 and mobile device 102 to store documents and media files. The device locator service 170 can enable a user to locate a lost or misplaced device. The home service 194 can enable a user to manage smart home devices with the user of a home application 192. Other services can also be provided, including a software update service to update operating system software or client software on the mobile devices. In one embodiment, the messaging service 140, media service 150, storage service 160, the home service 194, and device locator service 170 can each be associated with a cloud service provider, where the various services are facilitated via a cloud services account associated with the electronic devices 101 and 102.

In some embodiments, accessory device 101 and/or device group 101 and mobile device 102 may be registered with a certificate authority 106. In some embodiments, the certificate authority 106 is an entity that issues digital certificates, and the service may be implemented using a set of servers managed by a device manufacturer, service provider, or a registration service. The certificate provided by the certificate authority 106 may attest to the validity of received verifiable information about the device, such as a particular manufacturer for the device, a serial number, an identifier for a device group or other identifier, an indicator that device is part of a device group, and/or any other verifiable information. In some embodiments, a device manufacturer may establish the device group by grouping serial numbers of accessory devices in the device group. In further embodiments, the certificate can be encrypted by the device 101 and/or 102 prior to being sent to a third party and may be decrypted at an attestation service (e.g., certificate authority or another attestation service) when the third-party requests verification of information provided by accessory device 101, mobile device 102, smart home device, and/or devices within device group. In some embodiments, a secure token may be provided in requests to pair by an accessory device 101. Additional examples of paired devices using location services may be found in U.S. patent application Ser. No. 17/219,595, filed Mar. 21, 2021, entitled "Secure Pairing and Pairing Lock for Accessory Devices," which is incorporated by reference herein in its entirety.

Electronic devices 101 and 102 may have applications, services, and functionality locally accessible on the devices. In particular, mobile devices 101, and/or 102 may have a device locator application (e.g., a "Find my" application) 190 to utilize device locator services 170 and location services 180. Locally accessible data may be stored on known locations 182 and safe or trusted locations 184. In some instances, machine learning algorithms 186 may be used to identify user routines, known locations 182, and/or trusted locations 184. Although cluster analysis is provided as an example of machine learning algorithms that may be used, those with skill in the art will recognize that other algorithms may be used to identify potential known or trusted locations. By way of example, cluster data analysis may be used to identify and classify and provide semantic labels for locations or defined spaces, such as locations frequented by a user. Safe or trusted locations 184 may be designated explicitly or confirmed as such by a user of the mobile device 102 after data analysis. Additionally, user routines may be defined explicitly by a user of the mobile device 102. In other instances, the known locations 182, the trusted locations 184, and user routines may be classified offline and provided by device locator service 170, a home application or service, or a third-party (e.g., a database with map information, a home hub device, etc.).

On-device heuristics and/or machine learning models may be used to infer relationships between a user and locations (e.g., including defined spaces) based on analysis of the locally stored data on frequented locations including frequently visited locations by the user, known locations, routines, and/or any other locations. For example, a frequently visited location such as a home, a vehicle, a workplace, any location frequented by a user with mobile device (e.g., accessory devices, 101 and mobile device 102) and/or any other location designated as a trusted location 184 by the user. Known locations 182 may be business locations, public spaces, parks, museums, front yard, back yard, and/or any other location that may be frequented by a user. Boundary information for the respective stored locations may be stored along with classification type for the location and any semantic label assigned to the location. Stored information may include a defined set of boundaries or a radius distance around a point location to allow for creation of a geofence for the location. The geofence is a virtual perimeter for a real-world geographic area. Global positioning system (GPS) may be used to create a virtual fence around a location and track the physical location of the electronic devices 101 and 102 within the geofence boundary as well as entry and exit of the bounded area.

Machine learning algorithms 186 may include on-device heuristics, machine learning algorithms, or a combination thereof to analyze and assign a label regarding movement or travel of a device to be designated as being "in transit" state, "moving" state, or "settled" state in a defined space for a time period. Analysis may be performed using a variety of signals from data sources available to the mobile device 102, including, but not limited to, the following: sensor data, positioning data, calendar data, transit card usage data, application data, historical data on patterns/routines of travel, and/or any other data accessible to the mobile device 102. In some embodiments, a mobile device 102 may be classified with a "settled" semantic label after remaining within the geographic boundaries that define a location (e.g., the trusted location 184) for a defined time period. Positioning data for the mobile device 102 may remain within the boundaries of a geofence for a particular location for a duration of time (e.g., 5 minutes). Sensor data, such as accelerometer data, may indicate that the mobile device 102 is at rest to support an inference of being settled.

Application data may support the inference that the mobile device 102 is settled, such as the mobile device being located at a calendar appointment location. Application data indicating a type of application in use may also provide an inference of the device being settled, such as using a media application and/or a smart home device. Historical data for the user on routines or patterns in travel may be used to determine whether the mobile device 102 is settled in a defined space, such as a bedtime routine at a home or hotel location. Mobile device 102 may be classified as with an "in transit" label based on prior behavior, patterns, or routines for the user and analyzed on mobile device 102. For example, the user may have routine of going to work around the same time every day and an "in transit" state may be assigned if the data on the device supports that the pattern is being repeated. In the simplest case, a speed at which the mobile device is moving or entering and exiting known geographic areas (e.g., using geofences) may allow for the inferring that the mobile device 102 is in transit. If the mobile device 102 is detected as accelerating in known areas of transit (e.g., on roads, highways, train routes, etc.), then the mobile device 102 may be given the status of "in transit." Similarly, if transit applications/cards are used/in use, then the mobile device 102 may be designated as "in transit".

Figure 2:
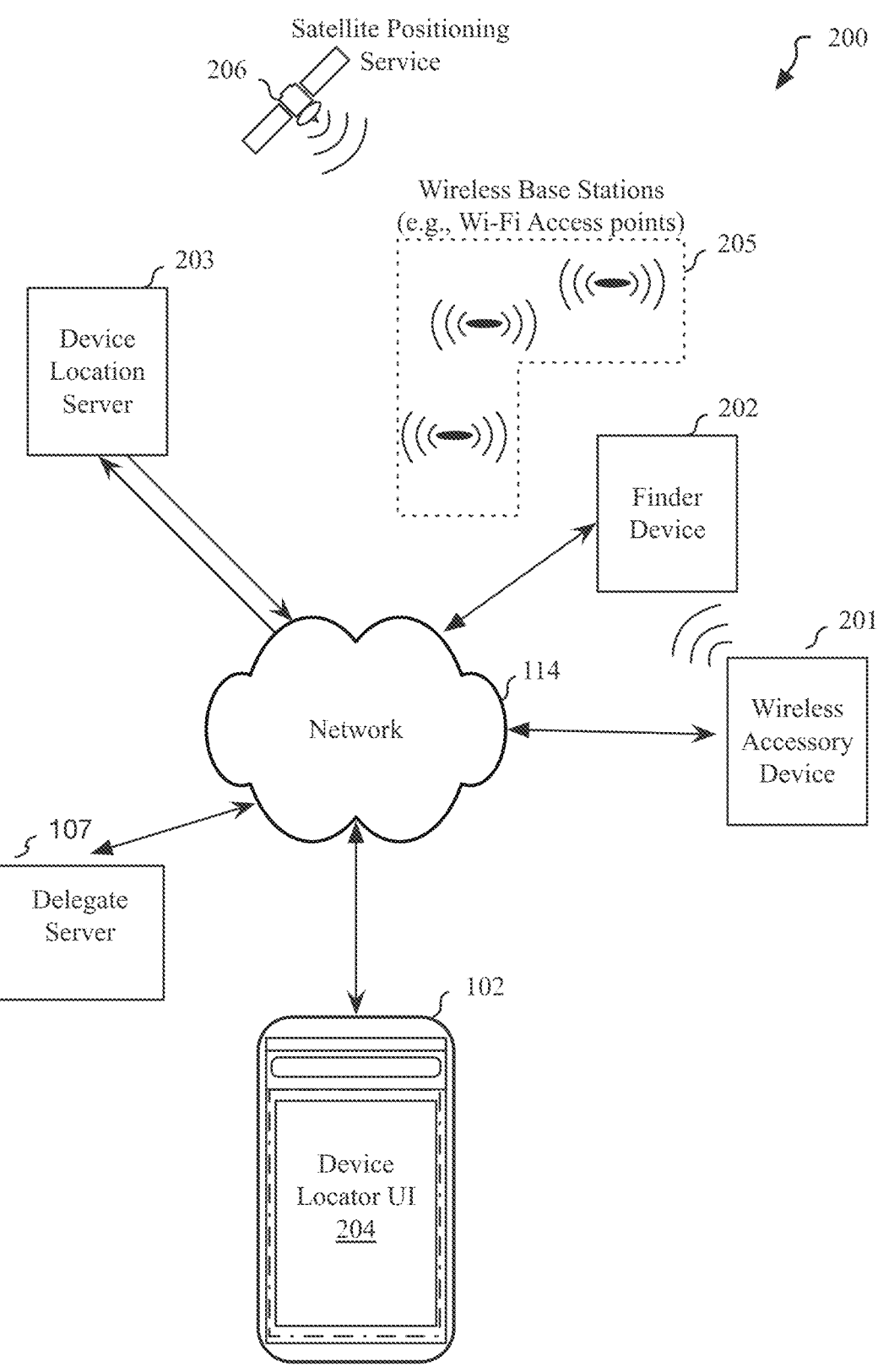
FIG. 2 illustrates a system to locate a wireless accessory device, according to an embodiment.

FIG. 2 illustrates a system 200 to locate a wireless accessory device 201, according to an embodiment. In one embodiment, the wireless accessory device(s) 201 is a locator tag associated with an item, such as luggage, and the accessory device 201 is paired to mobile device 102. Each accessory device 201 includes one or more wireless transceivers and can communicate, either directly or indirectly (e.g., through another device or computer) with a companion device (e.g., mobile device 102) over a wireless network or peer-to-peer communication link. Accessory device(s) 201 may provide a beacon signal for one or more accessory devices and/or each accessory device 201 may be independently and separately capable of being found by each providing the beacon signal. Some examples of wireless accessory devices 201 include, but are not limited to, the following: wireless earbuds, EarPods, APPLE AirPods, input devices, a charging device, a case for accessories, headphones, headsets, fitness equipment, health equipment, display devices, external hard drives, other wearable devices (e.g., smartwatches, fitness bands, optical head-mounted displays) adapters, speakers, device locator tags, and/or any other mobile devices. Paired groups of accessories may be the same type of device (e.g., speakers, AirPods, fitness weights, etc.) or different types of devices (e.g., smartphone and credit card reader, etc.).

The wireless accessory device 201 can also include other wireless devices such as input devices including, but not limited to credit card reading devices, stylus devices, mouse, keyboard, game controllers and/or remote controls. The wireless accessory 201, in one embodiment, also includes smartphones, tablet computers, laptop computers, smart speaker devices, televisions, or television set top boxes that at least temporarily are unable to access a wide area network, such as the Internet (e.g., wide area network 114 as in FIG. 1). The wireless accessory 201 can also be any other wireless device, including beacons or locator tags that can be attached to other devices to enable the tracking or locating of those devices. In one embodiment, the wireless accessory 201 can be from a device group of accessory devices that are paired with the mobile device 102 using a wireless technology standard, such as but not limited to BLUETOOTH. The wireless accessory 201 can also communicate with the mobile device 102 and/or sharee/delegate devices over wireless technologies including the implementation of any wireless standards and protocols, such as Wi-Fi direct, Zigbee, or AirPlay. While the companion device to which the wireless accessories 201 are paired is generally referred to as a mobile device 102, companion devices are not limited to mobile devices. Companion devices, in some embodiments, can also include laptop or desktop devices and can additionally include some wearable accessories, such as but not limited to a smart watch device or a wearable display.

In one embodiment, the wireless accessory 201 can periodically transmit a wireless beacon signal. The wireless accessory 201 can transmit the beacon signal using one of a variety of wireless technologies described herein (e.g., BLUETOOTH, Wi-Fi, etc.) and in one embodiment can also beacon using an ultra-wide band (UWB) radio technology. The beacon signal can be transmitted using a single wireless technology, one of multiple selectable wireless technologies, or multiple simultaneous wireless technologies. The beacon signal can transmit a beacon identifier that includes information to specifically identify the individual wireless accessory 201, and/or a device group. In one embodiment, the beacon identifier is a public encryption key associated with the device.

The beacon signal can also convey information about the wireless accessory 201, such device status information and/or verifiable information. Device status information in the beacon signal may include, but is not limited to the following: a beacon type, a device classification, a battery level, any pre-defined device status, a device state, a lost status, an alarm status, a separated from owner status, a near-owner status, a proximate to one or more accessory devices in a device group status, a wired or wireless connection status, a physically connected to one or more accessory devices in a device group status, a pairing status indicating whether accessory device is paired or not paired, a pending pairing status, a battery life state, a charging status, a near-smart home device status, a near sharee device status, a near external entity establishment status, and/or any other status information. The near-owner status can indicate that the wireless accessory 201 has detected the nearby presence of the mobile device 102 associated with the owner of the accessory. The lost or "separated from owner" status can indicate that the wireless accessory 201 has determined itself to be lost or has been placed into a lost state by the owner of the device. The alarm status can indicate that the wireless accessory 201 was placed in a state that the device should trigger an alarm if moved from a current location. The near-smart home device status may indicate that the wireless accessory device 201 is in communication with smart home device for the owner device and/or a finder device. The near sharee device status may indicate that the wireless accessory device 201 is in communication with a recipient of a share of keys from the wireless accessory device 201 owner. The near external entity establishment status may indicate that the wireless accessory device 201 is located near an establishment of the external entity, such as a check-in desk or a baggage storage facility.

In some embodiments, verifiable information may include any information that may be needed to establish trust or authority that a pairing process, a setup process, a device discovery process, and/or a finding process may proceed with the device presenting the verifiable information. By way of example, verifiable information may include information established by a device manufacturer, such as a serial number or a set of serial numbers in a device group or a smart home device. In some embodiments, the verifiable information may include status or state information for the device. The verifiable information may include, but is not limited to, the following: a device type, a member of device group, a serial number, a device group, serial numbers of other devices within a device group, state or status information, a software version, and/or any other verifiable information. Verifiable information may be sent to the certificate authority 106 or other attestations service to verify received information presented by the device to another device. Verifiable information may be encrypted and/or sent with a token to allow for further verification of the device.

In some embodiments, the beacon signal can be detected by a finder device 202, which is locally proximate to the wireless accessory 201 in order to use crowdsourcing to locate a lost wireless accessory 201. In further embodiments, the sharee device may provide additional functionality as a finder device 202. The finder device 202 can be a similar device as the mobile device 102 and can receive and transmit data over a wide area network 114 and receiving and transmitting using similar wireless technologies as the wireless accessory 201 (e.g., BLUETOOTH, etc.). Particularly, the finder device 202 can receive data using the wireless protocol over which the beacon signal is transmitted. The finder device 202 can determine a location using one or more location and/or positioning services including, but not limited to a satellite positioning service 206 or a terrestrial positioning system using RF signals received from wireless base stations 205 such as Wi-Fi access points or cell tower transmitters of a cellular telephone network. In an embodiment, the finder device 202 periodically stores its location as determined based on the one or more location and/or positioning services. The stored location can be associated with a timestamp for which the location was determined. When the finder device 202 receives a beacon signal from the wireless accessory 201, the finder device 202 can transmit a location for the finder device 202 over the wide area network 114 to a device locator server 203. The timestamp for a determined location for the finder device 202 can be correlated with a timestamp for which a beacon signal was received to associate a geographic location with a received beacon signal.

Where the wireless accessory 201 provides a public key within the beacon signal, the finder device 202 can encrypt the determined location data and transmit the encrypted location data to the device locator server 203 over the wide area network 114. In one embodiment, additional data can either be encrypted and transmitted along with the location data or transmitted unencrypted to the device locator server 203. For example, the RSSI for the beacon signal can be transmitted along with the location data. The RSSI data can then be used to determine the distance of the wireless accessory 201 from the finder device 202 and assist in triangulation on the owner device. Where the RSSI data is transmitted in an unencrypted state, in one embodiment the server can use RSSI information to reduce noise by discarding very weak signals if other, stronger signals are present. In one embodiment, UWB ranging data can also be provided, where such data is available.

In some embodiments, the beacon signal from the wireless accessory 201 can be detected by a sharee device, a variant of finder device 202. In some embodiments, the mobile device 102 may authorize sending a data packet with the request that contains one or more public keys to identify advertisements from the wireless accessory device 201. If the sharee device detects the beacon signal from the wireless accessory device 201, then the sharee device may communicate that the beacon signal was received via the device location server 203 to the mobile device 102. For example, if the beacon signal from the wireless accessory device 201 includes an advertisement with a key from the one or more public keys sent by the mobile device 102, then the sharee device may respond by sending location information (e.g., ranging data, signal strength information, etc.) for the wireless accessory device 201 to the mobile device 102 and/or the device locator server 203.

In one embodiment, location information for the wireless accessory device 201 received from the sharee device can either be encrypted or transmitted unencrypted to the mobile device 102 and/or device locator server 203. A received signal strength indicator (RSSI) for the beacon signal can be transmitted along with the location data for the wireless accessory device 201 to the mobile device 102. The RSSI data can then be used to determine the distance of the wireless accessory 201 from the sharee device and assist in triangulation on the mobile device 102. The location information provided to the mobile device 102 may include information on the location of the wireless accessory 201 within the location environment. Where the RSSI data is transmitted in an unencrypted state, in one embodiment, the device locator server 203 and/or the mobile device 102 can use RSSI information to reduce noise by discarding very weak signals if other, stronger signals are present from other devices.

In one embodiment, the finder device 202 can behave differently upon receiving a beacon signal from a wireless accessory 201 depending upon a device status conveyed by the wireless accessory 201. For standard beacon signals, the finder device 202 can place encrypted location data into a queue and transmit the location data to the device locator server 203 during a periodic transmission window. However, if the wireless accessory 201 is indicating an alarm state, the finder device 202 can transmit the location data to the device locator server 203 immediately. In the case of the smart home device receiving an indication that the wireless accessory device 201 is in the alarm state, the smart home device may immediately play media files on behalf of the wireless accessory device 201. Additionally, the finder device 202 may not transmit the location data to the device locator server 203 if the beacon signal of the wireless accessory 201 indicates that the accessory is near the owner of the accessory. Alternatively, the finder device 202 may delay transmission of encrypted location data.

If the owner of the wireless accessory 201 wishes to locate the wireless accessory device 201, the owner can access a device locator user interface (UI) 204 on the mobile device 102. The device locator UI 204 can be associated with a device locator application that is used to locate electronic devices and accessories that are registered with an online account of the user, such as a cloud services account or another type of online account. The device owner, using the device locator UI 204, can query the device locator server 203 for location data that may have been transmitted to the device locator server by a finder device 202 of the wireless accessory 201. In one embodiment, the mobile device 102 can transmit the public encryption key associated with the wireless accessory 201 to the device locator server 203. The device locator server 203 can then return any stored location data that corresponds with the public encryption key. The location data returned to the mobile device 102 can be encrypted data that is encrypted by the finder device 202 using the public encryption key. The mobile device 102 can use an associated private key to decrypt the encrypted location data. The decrypted location data can then be processed by the mobile device 102 to determine a most probable location for the wireless accessory 201. In various embodiments, the most probable location for the wireless accessory 201 can be determined by triangulation from multiple received locations and using other data, such as a beacon signal RSSI associated with each location and time-stamp or UWB ranging data included within the location data.

Figure 3:
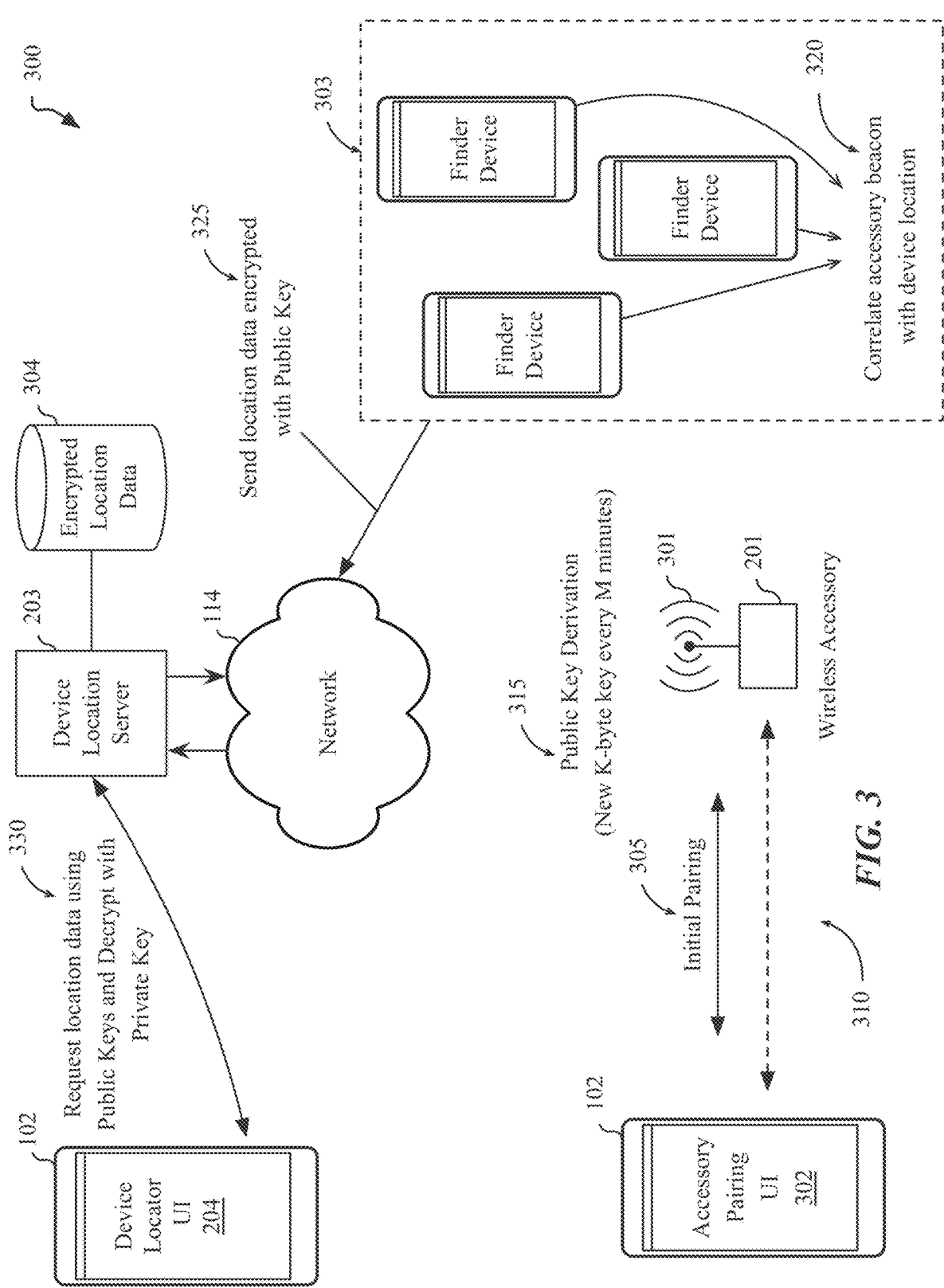
FIG. 3 illustrates a system for pairing and locating a wireless accessory, according to an embodiment.

FIG. 3 illustrates a system 300 for pairing and locating a wireless accessory device, according to embodiments described herein. In one embodiment a mobile device 102 of a user of the wireless accessory 201 (e.g., example of device 101) can present an accessory pairing UI 302 by which the user can pair the mobile device 102 with the wireless accessory 201. During an initial pairing (305) between the mobile device 102 and the wireless accessory 201, a public key exchange (310) can be performed between the mobile device and the wireless accessory 201. In one embodiment, during the public key exchange (310) the mobile device 102 and the wireless accessory 201 exchange public keys of public key pairs generated by the device and the accessory 201. In one embodiment the public key exchange (310) is a one-way transfer, in which the mobile device 102 transmits a public key of a public/private key pair to the wireless accessory 201. Alternatively, or additionally, the public key exchange (310) may be a Diffie-Hellman key exchange in which the device and the accessory establish a shared secret between two parties. In one embodiment, the public key exchange (310) additionally uses elliptic curve cryptography to establish the shared secret. For example, Elliptic-curve Diffie-Hellman (ECDH) can be used to enable the establishment of a public key pair and one or more shared secrets. In one embodiment, the one or more shared secrets include an anti-tracking secret, which can be used by the wireless accessory 201 to periodically derive additional public keys.

After the wireless accessory 201 has been paired with the mobile device 102, the wireless accessory 201 can periodically broadcast a beacon signal 301 that includes device status information and a beacon identifier. In one embodiment, the beacon identifier is a public key derived from a shared secret that is established during the public key exchange (310).

Additionally, the wireless accessory 201 can periodically perform a public key derivation (315) to generate a new public key and begin broadcasting the new public key as the beacon identifier. The public key is a K-byte key, with a new K-byte key generated every M minutes. The value K and M can vary between embodiments. In one embodiment, a K value of 28 bytes is used. In one embodiment, a K value of 27 bytes is used. The value K can be determined at least in part based on the beacon length associated with the wireless protocol used to transmit the beacon signal 301. In one embodiment, the beacon signal can transmit a variant of beacon advertisement packet associated with a low-energy radio protocol, such as BLUETOOTH Low Energy.

The value M, in one embodiment, is 15 minutes, such that a new K-byte key is generated every 15 minutes. In an embodiment, the predefined time value M is a privacy window of time in which a new key is generated as described herein. The public key can be derived determin-istically based on a timestamp and an anti-tracking secret generated during the public key exchange 310. The public key derivation (315) process enables the wireless accessory 201 to use different keys over time, preventing the long-term association with a specific key with a specific device. The key can be derived based on an anti-tracking secret known only to the mobile device 102 and the wireless accessory 201, allowing the mobile device 102, and only the mobile device, to determine which public key will be broadcast by the wireless accessory 201 at any given timestamp. The anti-tracking secret can be generated along with an ECDH public key and transferred to the wireless accessory 201. The anti-tracking secret can then be used to enable the wireless accessory 201 to generate a sequence of public keys $P_i$. In one embodiment, the sequence of public keys $P_i=\lambda_i \cdot P$, which defines a group operation between a scalar or exponent value $\lambda_i$ and group elements, such as, for example, Elliptic Curve points P. The scalar or exponent value $\lambda$=KDF(AT, i), where KDF is a key derivation function, AT is the anti-tracking secret, and i is a counter or timestamp.

In one embodiment, backtracking resistance can be enabled to protect the anti-tracking secret in the event the wireless accessory 201 is compromised. When backtracking resistance is enabled, the anti-tracking secret is transferred to the wireless accessory 201 but is not retained by the wireless accessory. Instead, the accessory computes a value $\lambda_{i+1}$=H $(\lambda_i||$time$)$, with $\lambda 0$=AT and H being a cryptographic hash function. The wireless accessory 201 then stores $\lambda_i$ for a given time period i. If the wireless accessory 201 is com-promised, only $\lambda_i$ for current and future values of i is exposed, without exposing the anti-tracking secret AT. In one embodiment, backtracking resistance is performed by periodically writing $\lambda_i$ to non-volatile memory of the wire-less accessory 201.

In one embodiment the wireless accessory 201 can trans-mit the beacon signal 301 every two seconds, although other beacon rates can be used, and the beacon rate can vary under certain circumstances. For example, the wireless accessory 201 can decrease a beacon rate when in a near-owner state. Beacon rate can also vary based on accelerometer triggered events. For example, the wireless accessory 201 can increase the beacon rate when in an alarm state, which can be triggered by the accelerometer on the wireless accessory 201.

The wireless accessory 201 can enter the near-owner state if, after transmitting the beacon signal 301, the wireless accessory 201 receives a reply from the mobile device 102 associated with the user of the accessory, which indicates that the mobile device 102 is within range of the wireless accessory. Additionally, while the wireless accessory is in the near-owner state, the amount of data transmitted by the beacon signal 301 may be reduced. In one embodiment, the rate at which new public keys are generated can also be reduced while the wireless accessory is in the near-owner state.

The wireless accessory 201 can enter an alarm state upon receiving a message from the mobile device 102 that indi-cates that the wireless accessory 201 should enter the alarm state. When in the alarm state, the wireless accessory can initially enter an armed state in which the wireless accessory 201 can reduce or cease the transmission of locator beacon signals, although other types of wireless signaling can persist. The wireless accessory 201 can remain in the armed state until the state is deactivated by the mobile device 102 or alarm is triggered. The alarm can be triggered, in one embodiment, upon detection of movement, for example, via an accelerometer within the wireless accessory 201. The alarm can also be triggered, in one embodiment, upon detection that the wireless accessory 201 has moved out of range of the mobile device 102 and is no longer in the near-owner state. When the alarm is triggered, the rate at which the beacon signal 301 can be increased, to increase the speed by which the wireless accessory 201 can be located.

The beacon signal 301 transmitted by the wireless acces-sory 201 can be detected by a set of finder devices 303 (finder devices may be finder device 202) and/or the mobile device 102, which are other electronic devices that can receive the beacon signal transmitted by the wireless accessory and are transmit location and other data associated with the beacon signal 301 to the device locator server 203 via the wide area network 114. In one embodiment the set of finder devices 303 include variants of the mobile device 102 or can be other types of electronic devices. For example, the set of finder devices 303 can perform operations (320) to correlate the beacon signal 301 received from the wireless accessory 201 with a device location associated with the finder device 303. As described with respect to FIG. 2, the device location can be determined via a satellite positioning service or a terrestrial positioning system that uses RF signals received from wireless base stations (e.g., Wi-Fi access points or cell tower transmitters). In one embodiment the set of finder devices 303 can also include stationary devices such as smart speaker devices, televisions, or television set top boxes that can receive the beacon signal 301.

The set of finder devices 303 can encrypt the location data with the beacon identifier (e.g., public key) received within the beacon signal 301 and send the location data (325) to the device locator server 203. The data sent by the set of finder devices 303 is sent anonymously and no identifying information for the finder devices is stored with the data sent by the finder devices.

The device locator server 203 can store encrypted location data in a data store 304, which in one embodiment can be a distributed database having multiple nodes. Hashes of the beacon identifier/public key of an accessory can be sent along with encrypted location data. The encrypted location data can be stored to a database node based on a hash of the beacon identifier. The encrypted location data can be indexed by the device locator server 203 using the hash of the beacon identifier. Sending the hash of the beacon identifier instead of the full beacon identifier prevents the storage of the full beacon identifier to the server. Other information can also be sent and stored with the location data, either in an encrypted or unencrypted state. The other information can include timestamps for when the beacon signal 301 was received, RSSI information for the received beacon, and/or ranging information determined, for example, via UWB ranging.

When the user or owner of the wireless accessory 201 wishes to locate the accessory, the user or owner can access the device locator UI 204 on the mobile device 102. The device locator UI 204 can be associated with a locator application 190 or feature of the mobile device 102. The device locator UI 204 may also have a web-based interface that can be accessed from the mobile device 102 or another type of electronic device, such as a laptop or desktop device. The mobile device 102, upon loading the device locator UI 204, can send a request (330) for location data to the device locator server 203. The request 330 can include a set of public keys or public key hashes, which can serve as beacon identifiers for the beacon data. The mobile device 102 can generate the set of public keys based on the secret information held by the mobile device 102 and the wireless accessory 201 and the timestamps over which the mobile device 102 wishes to receive location data. In one embodiment the set of public keys is the sequence of public keys $P_i$ that are generated based on the anti-tracking secret. The sequence of public keys $P_i$ corresponds to a matching sequence of private keys $d_i$. The mobile device 102 can generate the sequence of public keys, as well as the corresponding sequence of public keys $d_i$, where i is a counter or timestamp. In one embodiment, the mobile device 102 can generate and send the previous 24 hours of public keys (or hashes of the 24 hours of public keys) within the request 330. If no data is found for 24 hours of public keys, the mobile device 102 can send generate keys for an earlier period, back to a predetermined location data retention limit.

In one embodiment the encrypted location data is stored and indexed based on a hash of the public key instead of the public key to prevent the provider of the location service data from storing data that can be used to tie the encrypted location data to a specific device, and thus a specific user or user account. The finder device can send the hash of the public key that is broadcast within the beacon signal 301 associated with an observation location. The owner of the device can query the device locator server 203 using a hash of the public key that is determined for a query period.

In some embodiments, if a location query is to be performed via the web-based interface from an electronic device, such as a laptop or desktop device, keys to enable the decryption of the location data may be required to be sent to the electronic device. In one embodiment, decryption keys for the location data may be sent to the server that provides the web-based interface to enable the server to decrypt location data, at least while the location data is being viewed through the web-based interface. Before location data is displayed via the web-based interface, a notice may be presented to inform the user that location decryption keys are being temporarily shared with the web-based interface server to enable location data to be decrypted and presented. In one embodiment, the sharing of the location decryption keys can be performed via an automatic and temporary delegation of location query rights with a proxy account associated with the web-based interface.

In one embodiment, the wireless accessory 201 can be placed in a light lost mode. In the light lost mode, a set of future public keys can be generated for the wireless accessory and transmitted to the device locator server 203. The device locator server 203 can then notify the mobile device 102 if any location data is received that corresponds with a key in the set of future public keys. In one embodiment, a finder device that sends a location for a wireless accessory that is in the light lost mode can be directed by the device locator server 203 to relay a message to the wireless accessory 201 that notifies the wireless accessory that it is in the light lost mode. A similar mechanism can be used to relay a message to the wireless accessory 201 that places the accessory in an explicit lost mode. The explicit lost mode can be enabled by the user via the device locator UI 204. In the explicit lost mode, the wireless accessory 201 cannot be paired with another device unless unlocked by the owner. Additional examples of paired devices using location services may be found in U.S. patent application Ser. No. 16/543,227, filed Aug. 16, 2019, entitled "A System and Method for Locating Wireless Accessories," which is incorporated by reference herein in its entirety.

Figure 4:
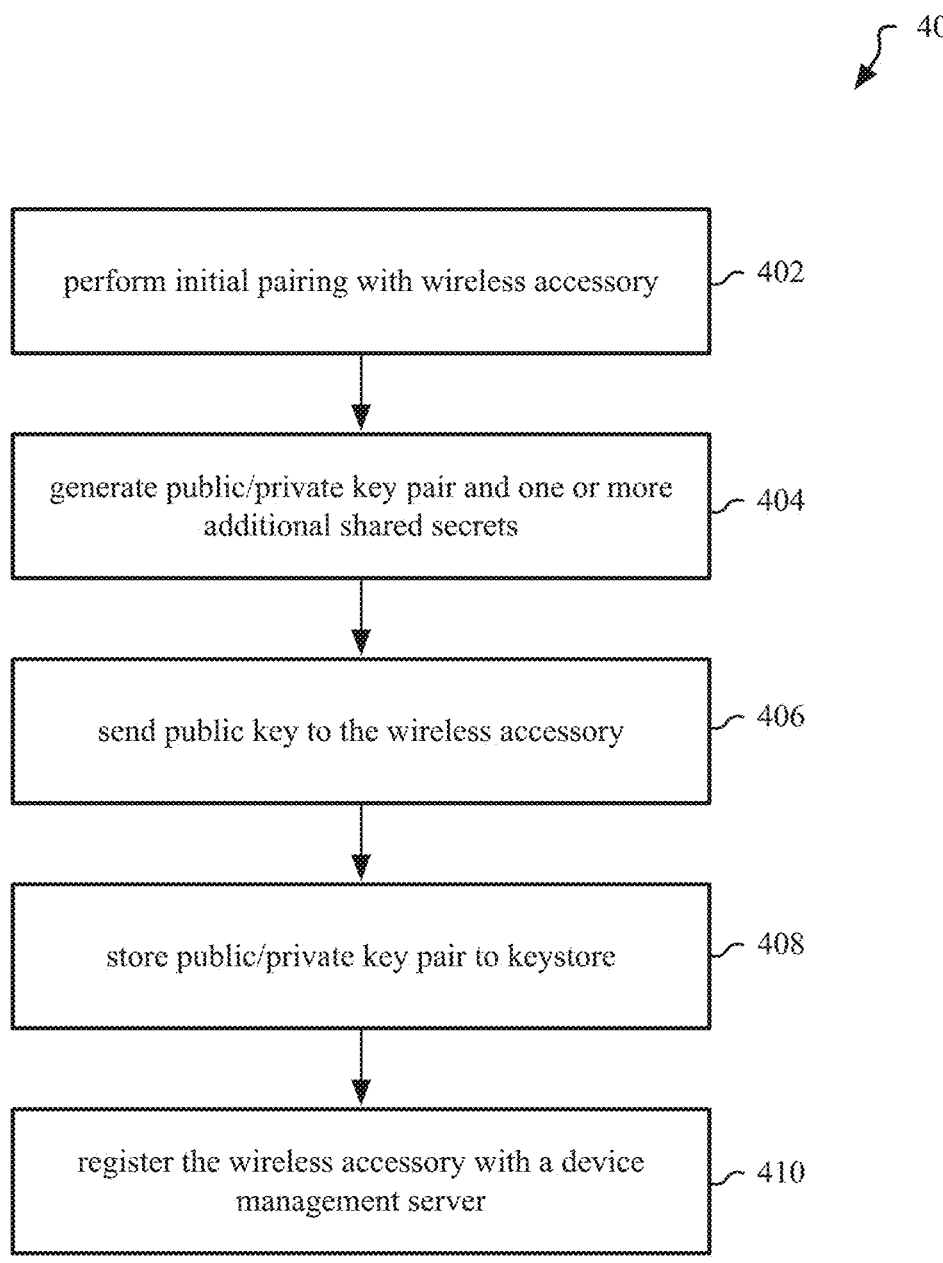
FIG. 4 is a flow diagram illustrating a method for use with device locator systems, according to an embodiment.

FIG. 4 is a flow diagram illustrating a method for use with the device locator systems according to an embodiment described herein. FIG. 4 illustrates a method 400 to pair a mobile device with a wireless accessory. Aspects of method 400 are also illustrated in FIG. 2 and FIG. 3, as described above. For example, the description of the operations below refers to the mobile device 102, wireless accessory 201 and device locator server 203.

As shown in FIG. 4, method 400 includes an operation (402) that performs an initial pairing with a wireless accessory. The initial pairing can be a BLUETOOTH pairing or another type of pairing using other wireless radio technologies. During the initial pairing, the mobile device and the wireless accessory can exchange identifiers, passkeys, or other credentials that enables a wireless data exchange to be performed between a mobile or another electronic device and the wireless accessory. On one embodiment the initial paring with the wireless accessory can include the exchange of credentials associated with the wireless protocol for which the pairing is performed, allowing all data exchanged wirelessly to have at least a first layer of encryption.

The mobile device can then generate a public/private key pair and one or more additional shared secrets (404). The device can then send the public key and one or more additional shared secrets to the wireless accessory (406). A variety of key generation techniques can be used. In one embodiment, a variant of ECDH is used to generate a public key pair for encryption. In one embodiment, the one or more additional shared secrets can include an anti-tracking secret that enables the wireless accessory to derive a new public key based on an existing public key.

After generating the public/private keypair and one or more additional shared secrets, the mobile device can store public/private key pair to keystore (408). In one embodiment the keystore is a cloud-based keystore that can be synchronized with other devices associated with the same cloud services account, or family of cloud services accounts, to which the mobile device and wireless accessory are associated. The cloud-based keystore allows the wireless accessory to be located by other synchronized devices. The mobile device can then register the wireless accessory with a device management server (410). Registering the wireless accessory with the device management server can form an association between the wireless accessory and the cloud services account to which the mobile device is associated. In some embodiments, the mobile device may register the wireless accessory and the device group 104. Information stored in a device group profile for the device group may also be synchronized between devices tied to a cloud services account (e.g., a user account). The device management server can be associated with other cloud-based servers that are used to facilitate cloud-based services accessible to the mobile device, such as the device locator server 203 of FIG. 2 and FIG. 3.

Figure 5A:
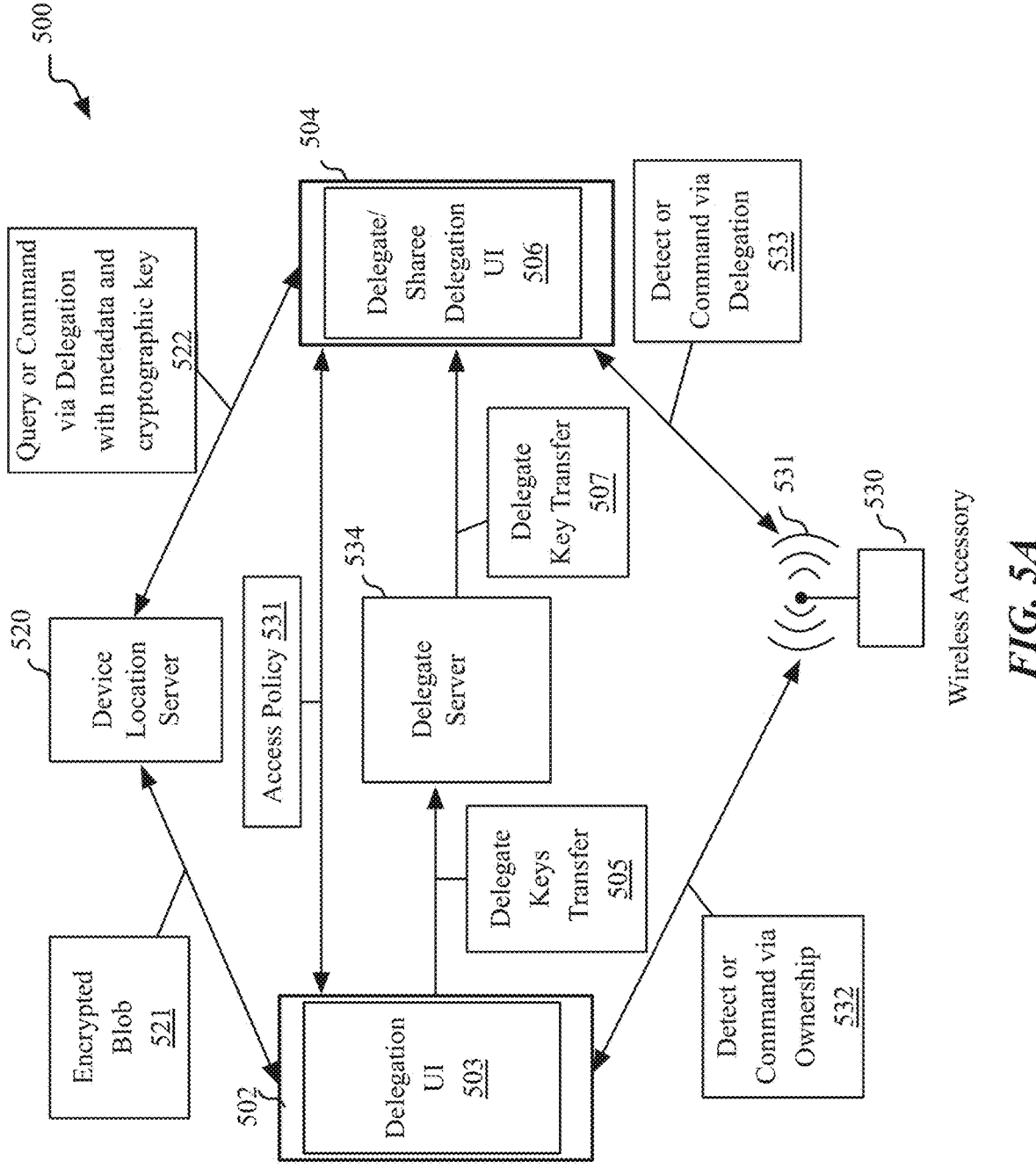
FIG. 5A is a network operating environment for electronic devices, according to an embodiment.

FIG. 5A is a network operating environment for electronic devices, according to an embodiment. FIG. 5A illustrates a system 500 in which access to a set of locator services for a wireless accessory 530 of owner device 502 can be delegated to a sharee with sharee device 504 for a defined period of time. In one embodiment, the system 500 includes an owner device 502, a sharee device 504, the device location server 520, the delegate server 534, and a wireless accessory 530. The owner device 502 and the sharee device 504 can each be a variant of mobile device 102 as described herein. The owner device 502 may detect or send commands to the wireless accessory 530 via ownership 532. The wireless accessory 530 can be a variant of wireless accessory 201 as described herein. The device location server 520 can be a variant of device location server 203 as described herein. The delegate server 534 can be a variant of delegate server 107 as described herein. In some embodiments, the owner device does not directly share with the sharee the cryptographic keys that the owner device 502 sends in requests for device location services with the device location server 520. The owner device 502 sends delegate cryptographic keys to a delegate server 534 that are provided to a sharee device 504 upon authentication of the sharee. Server-mediated sharing implemented with a device location server 520 and the delegate server 534 allows the owner device 502 to indirectly share device location services for an accessory device 530 with time-bound limits on sharing.

Figure 5B:
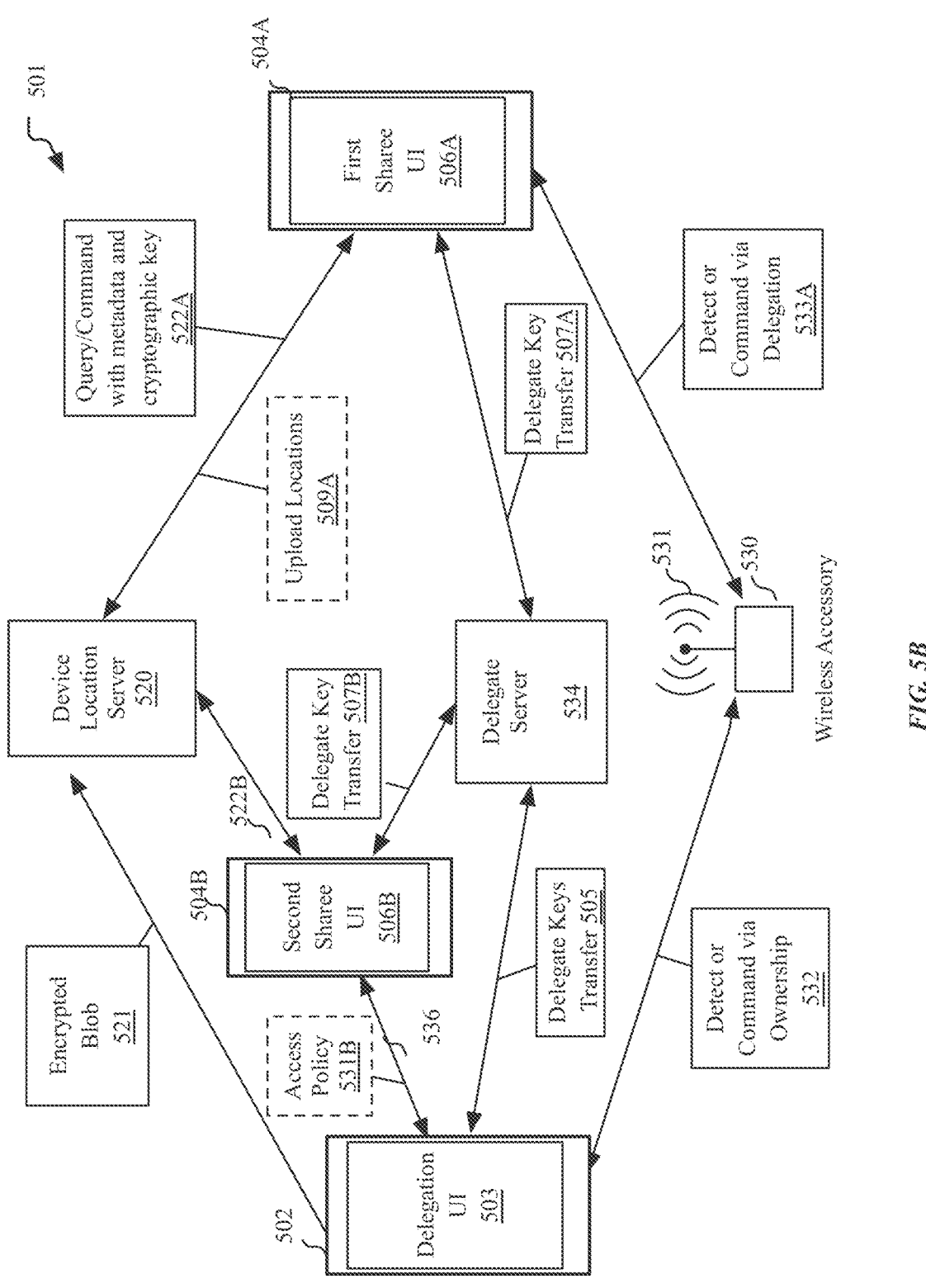
FIG. 5B is a network operating environment for electronic devices, according to an embodiment.

A user of the owner device 502, via a delegation UI 503, can delegate all or a subset of device location services accessible at the device location server 520 to the sharee via a transfer 505 of delegate keys to a share record in a share database established on the delegate server 534 for the sharee(s). The user via owner device 502 may establish an access policy 531 with the sharee upon acceptance by the sharee of a request to participate in the share of device location services with the owner and one or more sharees (multiple sharees are illustrated in FIG. 5B). The access policy 521 allows the sharee to set limits on which existing sharees for a share can have access to their sharee device 504 location information. The sharee is informed of current sharees that have been entrusted with location services access for the accessory device 530 and the sharee via the delegate/sharee delegation UI 506 may set limits on when their location information is divulged to the other sharees when the sharee is near the wireless accessory 530 and/or operating as a finder device detecting 533 the accessory device and uploading device location information 522 for the accessory device 530.

The user of the owner device 502, via a delegation UI 503, can select one or more capabilities offered from device location services (illustrated with device location server 520) that may be delegated to the sharee with sharee device 504 for a defined period of time. The sharee may be registered as the sharee at a delegate server 534 with an identifier, such as a user account identifier, an account identifier for a set of users, and/or an account identifier for an external entity stored in a share record at a share database at the delegate server. In an embodiment, a delegation server 534 provides upon request delegate keys (e.g., cryptographic keys, such as decryption keys) 507 and metadata for the share to the sharee device 504 to facilitate the share. The device owner may request storage of metadata and one or more delegate keys in the share record for retrieval by the sharee upon authentication of the sharee at the delegate server 534.

The metadata defines a set of conditions for the share of the set of location services capabilities. The metadata may define the share with an identifier for the accessory device 530, an account identifier for the sharee, time-bound limits for the share, the access policy for sharees participating in the share for the accessory device 530, and/or any other conditions for the share. The access policy for each sharee participating in a share of location services for the accessory device 530 is established when the sharee accepts a request to participate in the share. The access policy may define when, where, and who the sharee permits to be informed of their respective sharee device location. For example, when the sharee participates in the share, the sharee device may operate as a finder device for the accessory device and the sharee device may send encrypted location information for the accessory device to location services server 520 when the sharee device is in range to receive beacon signals from the accessory device 530.

The delegate keys in the delegate key transfer 507 are cryptographic keys (e.g., decryption keys) that allow for access of location services by the sharee upon request to the location services server. In some embodiments, the delegate keys are decryption keys that can be provided to the sharee by the owner device 502 via the delegate server 534 to decrypt encrypted blobs 521 stored at the location services server 520. The encrypted blob may be encrypted data that is padded with additional data designed to minimize data leakage.

A first type of delegate key transferred 507 to the sharee device 504 is a decryption key that allows the sharee to decrypt encrypted blobs (e.g., encrypted capability key blobs or encrypted location blobs, etc.) received by the sharee device 504 from the location services server 520. For example, the device locator server 520 may send an encrypted blob with an encrypted device locator capability key and the sharee device 504 may decrypt the encrypted blob to access the capability key. The capability key can be sent in request by the sharee to the device location server 520 authorizing the sharee device 504 to access a device locator service corresponding to the capability key. In another example, the device locator server 520 may send an encrypted blob with encrypted location information and the corresponding decryption key(s) for the encrypted location information. Continuing with the example, the received encrypted blob may be decrypted by the sharee device 504 with the transferred delegate key 507 to obtain both the decryption keys for the encrypted location information and the sharee device 504 can decrypt the location information with the obtained decryption keys.

A second type of delegate key is a cryptographic key (e.g., a decryption key) that can be sent by the sharee device 504 in a request for on-demand decryption 522 of encrypted blobs 521 at the device location server 520 on behalf of the sharee. In an embodiment, the encrypted blob 521 stored at the device location server 520 contains public keys or hashes of public keys generated by the owner device 502 to access location information for the wireless accessory device 530. The location services server 520 may ensure that the sharee satisfies a set of conditions in order to access each device locator service and will service the device locator requests from the sharee based on conditions defined by the accessory device 530 owner in the metadata. The second type of delegate key allows the sharee to access location services for the accessory device 530 using cryptographic keys generated and/or accessible by the owner device 502. With the provision of the encrypted cryptographic keys (e.g., encrypted hashes of public keys) by the owner device to the device location server 520 and delegate decryption keys, the owner device 502 is able to give access to the sharee device 504 to location information and maintain control over access to the cryptographic keys that are generated based on shared secrets between the accessory device and the owner device.

In an embodiment, the encrypted blob stored at the device location server 520 contains public keys or hashes of public keys generated by the owner device 502 and stored at the device location server 520 to access location information for the wireless accessory device 530. For example, the underlying public keys of the hashed public keys stored in the encrypted blob may be a set of rolling public keys (as shown in FIG. 3) generated at both the owner device 502 and the accessory device 530 based on a shared secret. Continuing with the example, the sharee device 504 may request location information 522 and provide a decryption key for the encrypted public hashes thereby allowing the device location server 520 to look up location information with public key hashes provided by the owner device on behalf of the sharee. The set of encrypted public key hashes can be accessible when the owner device 502 is offline and the device owner may limit access to future location information for the accessory device 530 by not directly providing a public key based on a shared secret to the sharee.

In an embodiment, delegation of location finding services for the accessory device can be performed by the owner device 502 by generating encrypted public keys or hashes of public keys for one or more privacy windows expected for the duration of time and providing those keys in the encrypted blob to the device locator server 520 via the transfer 521 of encrypted blob. The privacy window is a predefined period of time, such as M minutes, that a set of generated keys associated with the wireless accessory are valid. In an embodiment, there is at least one new key for each privacy window. For example, if the duration of time is an hour and the privacy window is 15 minutes, then the set of generated keys for the privacy window (e.g., 15 minutes) within the hour will include at least 4 keys.

In an embodiment, the owner device 502 may generate a share resource locator to allow for delegation of locator services. The share resource locator may include a delegate shared secret to generate a cryptographic key and/or one or more cryptographic keys that may be used by the sharee device to encrypt/decrypt data received in response to requests for device locator services and/or the owner device 502. For example, the share resource locator may include a delegate key of the first type. In an embodiment, the share resource locator may be implemented as a uniform resource locator (URL) and the sharee device 504 may access the share of the locator services 524 with an application, such as a web browser. In another embodiment, a sharee device 504 may access device locator server 520 with a third-party application provided by third-party server (not shown). In the case of a third-party application, the shared secret and/or cryptographic keys may be stored at the third-party server for the sharee device 504. Some embodiments may include the shared secret and/or one or more cryptographic keys in a portion of the share resource locator string that is only accessed within an application (e.g., a web browser) on the sharee device 504 and is not sent with a request with the share resource locator. For example, the portion of the share resource locator string may be implemented as an anchor link in a uniform resource locator request. The owner device 503 may send the share resource locator directly to the sharee device 504, third party server 536, and/or via the delegate server 534. An embodiment of a share resource locator to share locator services is described herein in regards to FIG. 16.

In some embodiments, delegate server 534 may serve as a key escrow with a set of keys for the sharee that are held for the duration of the defined period of time and the delegate server 534 may upon request send the delegate keys when the sharee satisfies the set of conditions. Because the delegate server 534 is serving as a key escrow, the device owner and the sharee participating in the share are opaque to the device locator service provider 520.

In some embodiments, metadata on the owner device 502 associated with the sharee and/or selected by the user on the owner device 502 to associate with the delegate entity for the share may be used to determine the number of privacy windows and associated hashed public keys accessible for the location information request. For example, if the user of the owner device 502 selects to associate privacy windows for a duration of time, then the public keys generated by the owner device in the encryption blob 521 may include a number of privacy windows expected for the duration of the time by the owner. The metadata may also establish the period of time that the share record with the delegate keys should exist in the share database for the delegate server 534. For example, the share may be torn down automatically when the share is terminated by the owner. The metadata may also establish if delegate keys should be generated for the expected duration of an event or a portion of the expected duration. For example, the metadata may indicate that only a portion of delegate keys for a duration of time may need to be generated and that keys may be generated on an ad hoc or on-demand basis for device locator information. In another example, metadata may indicate a set of conditions for the share of location information. The metadata may limit the sharing of location information based on a device status of the accessory device 530 when the location information was stored at the device locator server 520, such as "not near owner" or "not near another sharee."

The transferred delegate keys can enable the sharee device 504, via encrypted data in the encrypted blob at the device locations server 520, to perform a set of operations including but not limited to tracking, accessing, using, or controlling the wireless accessory 530. For example, the owner device 502 can delegate to the sharee the ability to detect 533 the wireless accessory via a beacon signal 531 transmitted by the wireless accessory 530 provided the sharee device 504 satisfies the set of conditions. The owner device 502 can also delegate the ability to query 522 a location of the wireless accessory 530 via the device location server 520 provided the sharee device 504 satisfies the set of conditions. The device locator server 520 can provide encrypted keys in the encrypted blob for location services capabilities for the wireless accessory and the sharee device 503 may use delegate keys 507 to decrypt the encrypted blob and access the capability keys. In some embodiments, delegate keys accessible with a browser or third-party application may be used to decrypt the encrypted blob and access capability keys.

An authenticated user of a sharee device 504 associated with the delegate entity may access locator services 520 after satisfying a set of conditions. The set of conditions may be established by the device owner and/or a delegate entity. The set of conditions may be for a state of the owner device, the status of the wireless accessory, the sharee device, and/or the authenticated user of the delegate device. The set of conditions may be time-based conditions, geo-based conditions, conditions based on status of the wireless accessory, and/or location of the owner device or sharee of the owner device. For example, if the owner device 534 or another sharee is near the wireless accessory 530, then the delegate device 504 may not be able to request device locator services. Continuing with the example, to ensure that locator services are not permitted when the owner device 534, the following conditions may need to be met for the sharee to request locator services: wireless accessory status is not near owner, wireless accessory status is not near sharee, device locator request is requested during a delegate entity event for the owner device, the wireless accessory current or last known location was not a safe location of the owner device, and/or the user has not explicitly ended the delegation of locator services. In an embodiment, each sharee may consent to providing their location information when located near the wireless accessory to other sharees. In some embodiments, the set of conditions for the authenticated user of a sharee device 504 for accessing locator services for the wireless accessory 530 may be implied based on metadata accessible on owner device 502 associated with an event. The device locator services permitted may change dynamically, for example, if the wireless accessory has a status of lost.

The delegate server 534 may act as a key escrow and provide delegate keys in the form of decryption keys to the sharee upon request and authentication of the sharee. In some embodiments, the device location server 520 may act as a key escrow and perform decryption on behalf of the sharee device 504. For example, the sharee device 504 may send a request for location information for the wireless accessory and provide a decryption key in the request to the location server 520 that was obtained by the sharee via the delegate server 534. Continuing with the example, the decryption key from the sharee device can be used by the device location server 540 to decrypt an encryption blob sent to the device location server 520 by the mobile device 502. The encryption blob stored on the device location server 520 can include a set of public keys or public key hashes, which can serve as beacon identifiers for the beacon data. The device location server 520 may use the public key hashes to retrieve the corresponding location information for the wireless accessory 530 and provide the encrypted location information and decryption keys to decrypt the encrypted location information by the sharee. The sharee 504 may decrypt both the provided decryption keys and/or location information using delegate keys provided by the delegate server device 534.

The owner device 502 can generate the set of public keys based on the secret information held by the owner device 502 and the wireless accessory 530 and the timestamps over which the owner device 502 wishes the sharee device 504 to receive location data. By limiting the decryption capabilities for particular location requests and underlying public keys of the owner device 502 and wireless accessory 530 to the device location server 520, the encryption capabilities and underlying public keys of the mobile device 502 remain opaque to the sharee.

Although embodiments are described herein with an owner device 502 possessing the capabilities to maintain and/or create the share, those with skill in the art will recognize that the owner may provide these capabilities to maintain and/or create the share to other devices. The capabilities to maintain and/or create the share include, but are not limited to, the following: generating public keys based on secret information (e.g., shared secrets) shared between the owner device 502 and the wireless accessory 530, generating public hashes, generating encrypted blobs, access to metadata, access to encryption keys, and/or generating delegate keys (e.g., first and second types of delegate keys) in order to create a share and/or delegate device locator services. In particular, the user of the owner device 502 may entrust other devices to maintain and/or the share when the owner device is offline to ensure that stale location information is not provided to delegates. The owner device 502 may provide the necessary data and entitlements to maintain and/or create the share on behalf of the owner. The owner device 502 may entitle other devices associated with an online account associated with the owner device. The online account associated with the owner account can be a user account for the owner of the owner device, and the devices may be second devices used by the owner of the owner device 502. The online account may be an account from a set of online accounts owned by other users, such as a set of online accounts for a family or one or more online accounts of sharees. In one embodiment, a cloud-based (e.g., a server-based) keystore may provide the shared information to provide the other devices with the capability to maintain and/or create the share and the keystore can be synchronized with other devices associated with the same cloud services account, or family of cloud services accounts, to which the owner device 502 and optionally, wireless accessory 530 are associated.

In some embodiments, the other devices with the In an embodiment, the owner device and set of other devices associated with the owner device may use an implementation of leader election to select a "leader" device from the owner device 502 and a set of devices associated with the owner device 502 that will serve as a selected device "leader" to maintain and/or create the share. A leader device may be selected when the owner device 502 is offline and/or when maintaining or creating the share may be too resource intensive for the owner device 502 with request are received.

FIG. 5B is a network operating environment for electronic devices, according to an embodiment. FIG. 5B illustrates a system 501 similar to system 500 in FIG. 5A in which access to a subset of locator services for a wireless accessory 530 of owner device 502 can be delegated to a sharee(s) for a defined period of time. FIG. 5B illustrates the effect of an addition or a removal of a second sharee 506B on the encrypted blob and delegate keys stored at the device location server 520, the delegate server 534, and the respective sharee devices 504A and 504B (collectively 504). A user of the owner device 502, via a delegation UI 503, may establish an access policy 531B with a second sharee when the sharee accepts a request to join a share of location services for accessory device 530. After the access policy 531 is established, an encrypted blob 521 with encrypted capability keys for the sharees and encrypted public keys or hashes of public keys corresponding to location information for the accessory device 530 accessible to the sharees is stored at device location server 520. Delegate keys for the sharee devices 504 are transferred to the delegate server device 534. Upon authentication at the delegate server 534, first sharee device 504A receives the delegate keys and metadata with delegate key transfer 507A. Similarly, second sharee device 504B receives delegate keys and metadata with delegate key transfer 507B upon authentication of the second sharee at the delegate server 534.

First sharee device 504A can then send query or command requests 522A and second sharee device 504B can send query or command requests 522B with their respective delegate keys and metadata. With each addition or removal of sharees to the share defined in the database of delegate server device 534, new sets of delegate keys and metadata are sent to the delegate server device 534 in addition to new encrypted blobs 521 stored at the device location server 520. First sharee with first sharee device 504A may upload encrypted locations to the device location server 509A when first sharee device 504 detects beacon signals from accessory device 530. In accordance with the access policy 531A established with first sharee device 504A and/or access policy 531B with second sharee device 504B, the location information for first sharee device exposed when location information is sent to the device location server 520 by the first sharee device 504A may be shared with the owner device 502 and/or second sharee 504B. If the access policy indicates that the first sharee device 504B does not want to share location information when near the accessory device 530, then other sharees and/or finder devices not associated with the share that are anonymously providing crowd sourced location information for the wireless accessory 530 may be used (as described in FIG. 2 and FIG. 3).

FIG. 5C is a network operating environment for electronic devices, according to an embodiment. FIG. 5C illustrates a system 5500 with the interactions between a sharee device 504 and the device location server 520 when the sharee device 504 sends a request 522 to the device location server 520 for location information on the accessory device 530. The sharee device 504 sends a request for location information 522 for the accessory device 530 with the metadata and a delegate decryption key for at least one hashed public key received from the delegate server 534. In an embodiment, the sharee device 504 sends a request with the share resource locator to the device location server 520 via a browser or web application (such as third party application), and the share resource locator includes a unique identifier that may be used to lookup the share identifier for the share. The share identifier may be used to lookup the share and corresponding metadata and delegate keys for the share. The delegate server 534 may send the metadata and delegate keys on behalf of the sharee device 504.

The device location server 520 encryption blob 521 contains encrypted hashed public keys $P_i$. as described herein with reference to FIG. 2 and FIG. 3. The encrypted blob 521 can include a set of public keys or public key hashes, which can serve as beacon identifiers for the beacon data of accessory device 530. The mobile device 502 can generate the set of public keys based on the secret information (e.g., shared secrets and/or derived from shared secrets) held by the mobile device 502 and the wireless accessory 530 and the timestamps over which the mobile device 530 wishes the sharee to access location data for the wireless accessory 530. In one embodiment, the set of public keys is the sequence of public keys $P_i$ that are generated based on the anti-tracking secret. The sequence of public keys $P_i$ corresponds to a matching sequence of private keys $d_i$. The mobile device 502 can generate the sequence of public keys, as well as the corresponding sequence of public keys $d_i$, where i is a counter or timestamp. In one embodiment, the mobile device 602 can generate and send 24 hours of public keys (or hashes of the 24 hours of public keys) in the encrypted blob 521 to the device location server 520.

The delegate decryption key sent in the request from the sharee device 504 (or on behalf of sharee device 504 via delegate server 534) to the device location server 520 can be used by the device location server 520 to decrypt the hashed public keys that the sharee is permitted to access. The hashed public keys can be used by the device location server 520 to lookup the location information 560 for the accessory device 530 provided by finder devices (e.g., anonymously and/or from participating sharees) corresponding to the hashed public keys. The device location server 560 may check the conditions in the metadata provided by the sharee device 504 in the location request to confirm that the location information 560 meets the conditions for access established between the sharees and the owner. The delegate decryption key is a decryption key (e.g., second type of delegate key) that is sent by the sharee in a request for on-demand decryption 522 of encrypted blobs 521 at the device location server 520 performed on behalf of the sharee allowing the sharee to access location information while preserving limits determined by the owner. By performing the lookup in the device location server, the owner is able to control the time frame in which the sharee has access. In some embodiments, the sharee is not able to access future location information for the accessory device 530 and/or location information for the accessory device if the share is removed. In some embodiments, the storage of the encrypted hashed public keys in the encrypted blob 521 at the device location server allows the sharee to access location information for the accessory device 530 when the owner device 502 is offline, powered off and/or unpaired from the accessory device 530.

Figure 5D:
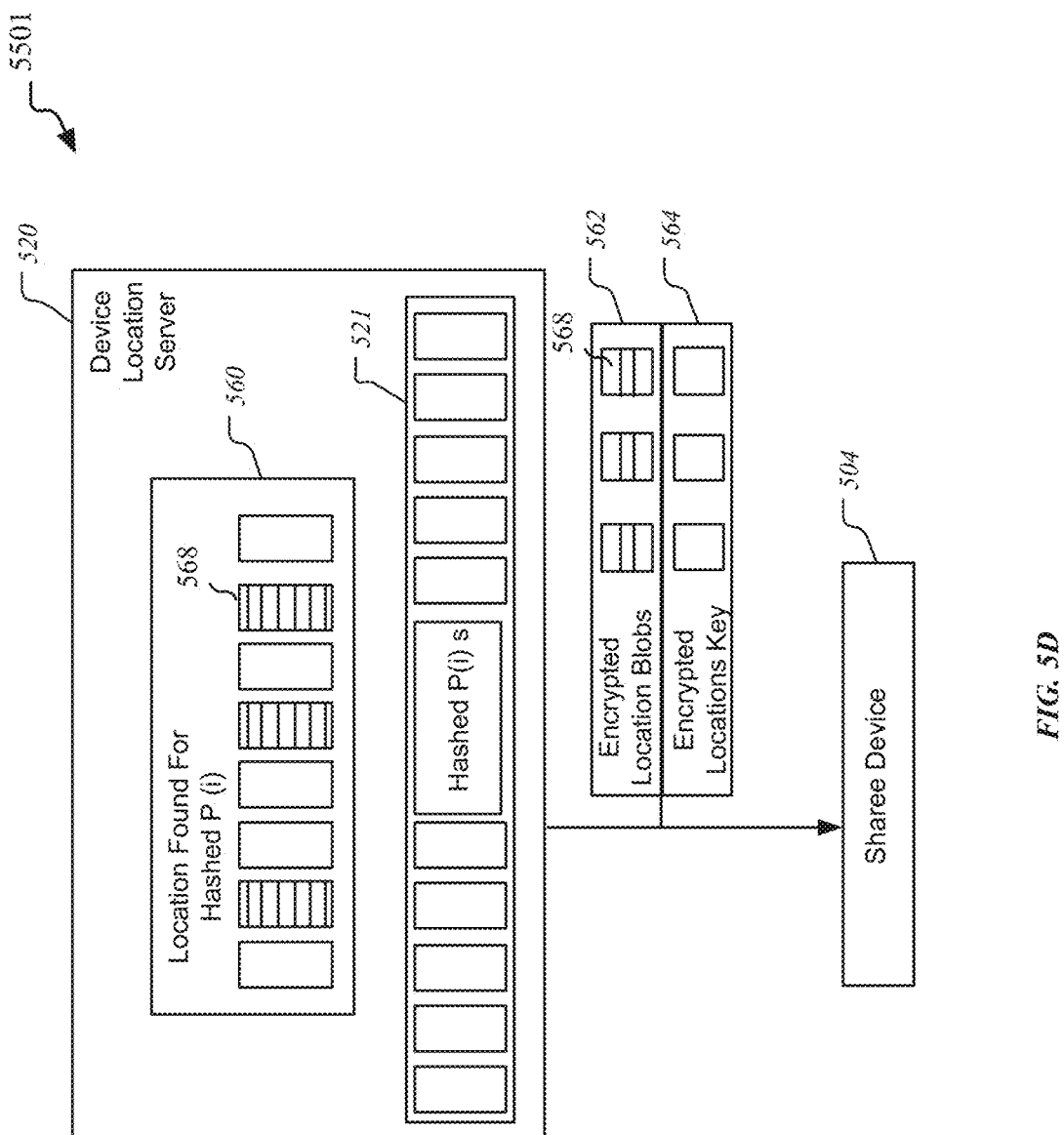
FIG. 5D is a network operating environment for electronic devices, according to an embodiment.

FIG. 5D is a network operating environment for electronic devices, according to an embodiment. FIG. 5D illustrates a system 5501 with the interactions between a sharee device 504 and the device location server 520 when the sharee device 504 sends a request 522 to the device location server 520 for location information on the accessory device 530 and the device location server 520 sends a response with encrypted location blobs 562 and encrypted location blob keys 564 that the sharee is permitted to access. As illustrated in 560, the device location server 520 look up with delegate decryption key for hashed public keys produces a set of encrypted locations for the accessory device 530. The sharee is permitted to access the location information for the shaded locations (as shown with 568 as an example) in accordance with the access policy established in setting up the share. The metadata may indicate the conditions for access to location information for the accessory device 530, such as with access policies established with the share between the owner and one or more sharees. In some embodiments, the metadata has conditions such as time of day when location information may be shared and/or whether the location information was sent to the device location server when the accessory device is near an owner or another sharee. By way of further example, if a first sharee detects the beacon of the wireless accessory 530 and encrypts the location information with a cryptographic key associated with the first sharee for subsequent upload and storage at the device location server, then the first sharee may have an access policy established as to whether the location information for the wireless accessory and the first sharee is shared with other sharees and/or the owner. The encrypted location blobs 562 that the sharee is permitted to receive are sent to the sharee device 504 along with encrypted locations decryption key 564. The sharee has a delegate decryption key (provided via the delegate server 534) to decrypt the encrypted locations decryption key 564 and access the location information in the encrypted blobs using the locations decryption key. In an embodiment, delegate decryption keys are accessible via a third-party server via a third-party application and/or a web browser to decrypt the encrypted location blobs.

FIG. 6A is a flow diagram illustrating methods for use with device locator systems, according to an embodiment. FIG. 6A illustrates the interactions between the owner device 502, the device location server 520, and the delegate server 534 for provision of server-mediated management of sharing an accessory device. An owner device 502 may establish an access policy with a sharee upon acceptance of a request to participate in a share of device location services for the accessory device 530 with the owner and one or more sharees (601). The sharee is informed of current sharees that have been entrusted with location services access for the accessory device 530. In some embodiments, the one or more sharees and owner device 502 are viewed as part of a "circle of trust" for access to the accessory device location information. The access policy may define when location information related to the owner or the sharee is divulged to other sharees, such as when the accessory device 530 is near to a sharee or the owner. The owner and sharee devices are variants of finder devices and may be optionally sending encrypted location information for the accessory device 530.

An owner device 502 generates a set of hashes of public keys that can be used to look up location information for an accessory device 530 for a duration of time (e.g., one or more privacy windows) (602). The owner device 502 may generate hashed public keys $P_i$ as described herein with reference to FIG. 2 and FIG. 3. The set of public keys or public key hashes, which can serve as beacon identifiers for the beacon data of accessory device 530, may be used to look up location information for the accessory device 530. The mobile device 502 can generate the set of public keys based on the secret information held by the mobile device 502 and the wireless accessory 530 and the timestamps over which the mobile device 530 wishes the sharee to access location data for the wireless accessory 530. In one embodiment, the set of public keys is the sequence of public keys $P_i$ that are generated based on the anti-tracking secret described in reference to FIG. 2 and FIG. 3. The sequence of public keys $P_i$ corresponds to a matching sequence of private keys $d_i$. The mobile device 502 can generate the sequence of public keys, as well as the corresponding sequence of public keys $d_i$, where i is a counter or time-stamp.

The owner device encrypts the set of public hashes to form an encrypted blob (604) that is stored at the device location server 520 (606). In one embodiment, the owner device 502 can generate and send 24 hours of public keys (or hashes of the 24 hours of public keys) in the encrypted blob 521 to the device location server 520.

The owner device may generate one or more capability keys for device location services capabilities, such as play sound, present finder experience user interface, request to add another sharee, etc. The capability keys may be encrypted and provided in the encrypted blob stored at the device location server 520 (606). The decryption keys for the encrypted blob and metadata providing conditions for location services for the sharee are sent to the delegate server 534 (610).

The delegate keys (decryption keys) and metadata are stored in the delegate server 534 share database (612). Metadata may determine a sharee, a share expiration time, and/or any other conditions for the share (614). The sharee may request the share information from the delegate server 534 and upon authentication of received credentials for the sharee (616), the delegate keys and metadata are provided to the sharee device (618).

The sharee device 504 may request a device location service for the accessory device 530 from the device location server 520 (622) with metadata and a delegate capability key and/or delegate decryption key for hashed public keys as described in regards to FIGS. 5A-5D. In another embodiment, the sharee may request a device location service for the accessory device 530 with a share resource locator via a browser or third party application, and the share resource locator may include a unique identifier that corresponds to a share identifier. The share identifier may be used to look up the share at the delegate server 534 to retrieve the metadata, delegate capability key and/or delegate decryption key for the request. The access policy for location services for the sharee may be verified by determining if conditions are met in the received metadata (624). In some embodiments, the metadata may identify the expected sharee identifier, the duration of the share, the expiration time of the share, access policies for location information, and/or any other conditions for a share. For example, the access policies established between sharees and/or owners participating in the share may indicate time frames and/or accessory device status information in which access is permitted or denied. Continuing with the example, the access policy may indicate that a device status of "near owner device" and/or "near sharee device" is not permitted during a defined time frame.

The device locator service may optionally provide encrypted device location services capability keys and the sharee may decrypt the encrypted capability keys with a delegate decryption key provided to the sharee by the delegate server (626). In some embodiments, the device location server 520 may use a delegate key received in a request from the sharee device to decrypt data from the encrypted blob on the device location server 520 to access location information on behalf of the sharee (626). For example, the delegate decryption for hashed public keys provided to the device location server 520 in a location request from the sharee device may permit on-demand look up and provision of the location information for the accessory device 530 as described in FIGS. 5A-D. The delegate decryption key may be used by the device location server 520 to retrieve hashes for public keys that can be used to retrieve encrypted location data for the wireless accessory 530 and encrypted decryption keys for the location information. Metadata for the sharee may provide conditions for the location information permitted to be sent to the sharee device, such as location information obtained with the accessory device status was not "near owner." The sharee device may receive the encrypted location information and decryptions keys for the encrypted location information. The sharee device 504 may have delegate keys from the delegate server 534 to decrypt the encrypted decryption keys and access the location information for the wireless accessory 530. In an embodiment, the delegate keys are accessed via a browser and or from a third-party server.

FIG. 6B is a flow diagram illustrating methods for use with device locator systems, according to an embodiment. FIG. 6B illustrates the interactions between the sharee device 504, the device location server 520, and the delegate server 534 for provision of server-mediated management of sharing an accessory device 530. An owner device 502 may establish an access policy with a sharee upon acceptance of a request to participate in a share of device location services for the accessory device with the owner and one or more sharees (601). The sharee is informed of current sharees that have been entrusted with location services access for the accessory device 530. In some embodiments, the one or more sharees and owner device are viewed as part of a "circle of trust" for access to the accessory device location information.

The sharee device may send a request for the share information from the delegate server 534 with authentication credentials (603). Upon authentication of received credentials for the sharee (616), the delegate keys and metadata are provided to the sharee device (618). The delegate keys (decryption keys) and metadata are stored in the delegate server 534 share database. Metadata may determine a sharee, a share expiration time, an access policy, and/or any other conditions for the share. Optionally, updated delegate keys and metadata are sent to the sharee device 504 in response to addition or removal of another sharee (620). A first type of delegate key is provided to the sharee is a decryption key that allows the sharee to decrypt encrypted blobs (e.g., encrypted capability key blobs or encrypted location blobs, etc.) received by the sharee device 504 from the location services server 520. For example, the device locator server 520 may send an encrypted capability key blob with an encrypted device locator capability key to allow the sharee to request device locator services corresponding to the capability key. In another example, the device locator server 520 may send encrypted location information in the encrypted location blob that may be decrypted by the sharee with the delegate keys 507, if the sharee is granted a location finding capability from the owner. A second type of delegate key is a decryption key that can be sent by the sharee in a request for on-demand decryption 522 of encrypted blobs 521 at the device location server 520 on behalf of the sharee.

The sharee device 503 may send a request for device location capabilities for a shared accessory device 530 (605) and the request may include metadata with conditions for the share to the sharee. The device location server 520 may receive a request from the sharee device for a location service for an accessory device 530 (622). After verifying the sharee access policy provided in the metadata with the request (624), the device location server 520 may respond to the request with optionally encrypted capability keys (626A). The sharee device 504 may decrypt the capabilities for the shared accessory device 530 to determine location services available to the sharee device 504.

Optionally, the request from the sharee (622) may include delegate keys that allow the device location server 520 to decrypt encrypted blobs on the device location server 520. For example, the device location server 520 may decrypt encrypted hashed public keys in an encrypted blob at the device location server 520 using a received delegate decryption key in the request from the sharee device 504 (609). The device location server 520 may decrypt public hashed keys on behalf of the sharee (626B) and perform a lookup to send encrypted locations and decryption keys for the encrypted locations produced with the lookup (626C), as described with FIGS. 5A-D. In another embodiment, the share identifier may be used to retrieve the delegate decryption key from the delegate server 534, when the request from the sharee was received via the share resource locator.

Figure 7B:
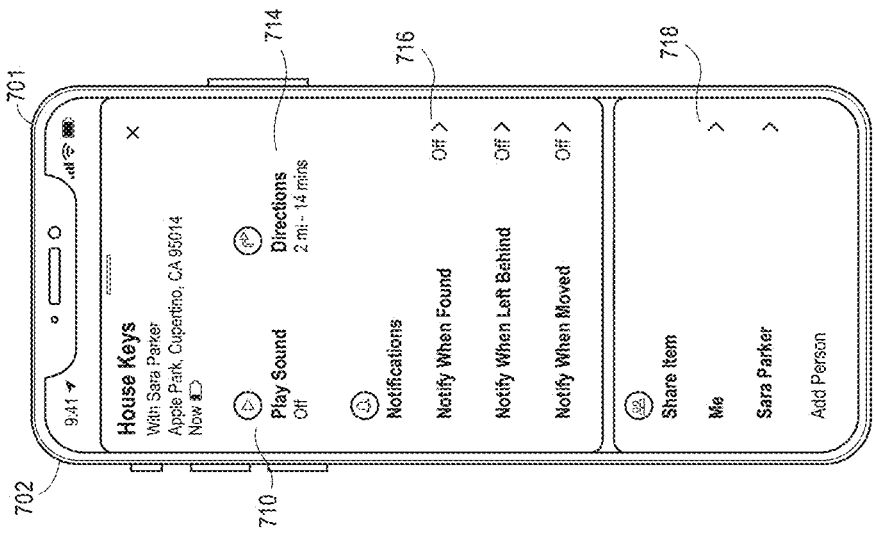
FIGS. 7A-9D are user interfaces for device locator services, according to some embodiments.
Figure 7A:
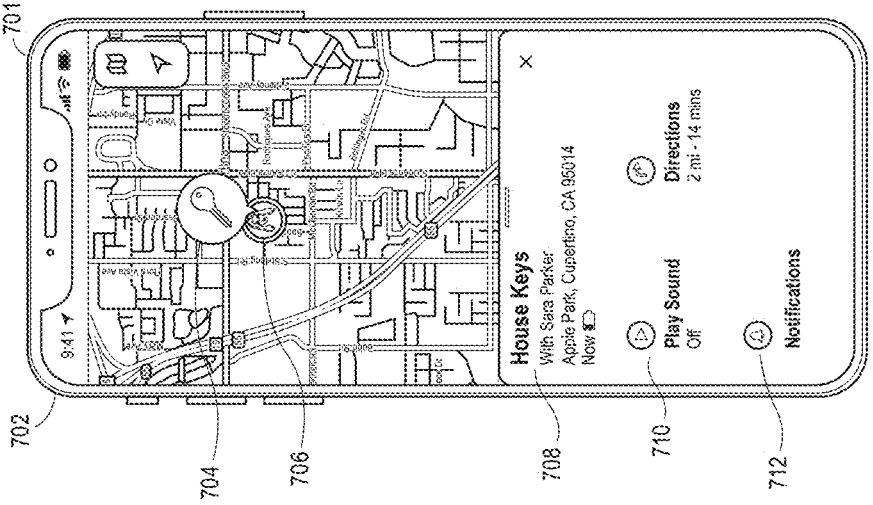

FIGS. 7A-9B are user interfaces for the device locator services, according to some embodiments. As shown in FIG. 7A, the device locator UI 701 of an owner device can present a graphical user interface on electronic device 702 with accessory device location 704 for an accessory device associated with an item 708 "House Keys" and location information is presented as shown with item "House Keys" located with a sharee 706 within a map. The owner and sharee have an access policy in which the owner is permitted to have location information for the item even when the item has a device status of located near the sharee as illustrated with sharee 706 listed in the device locator UI 701 as "Sara Parker" 708. The owner has device locator capabilities of "Play sound" 710 and "Notifications" 712 (provided in more detail in 716 of FIG. 7B. As shown in FIG. 7B, the device locator UI 701 of an owner device can present a graphical user interface on electronic device 702 with accessory device location 704 and the owner designated as "Me" 718 has device locator capabilities of "Play sound" 710, "Notifications" 712 (e.g., "Notify When Found," "Notify When Left Behind," "Notify When Moved"), and "Share Item" by selecting an affordance to "Add Person." As shown in FIG. 7B, the owner "Me" 718 is sharing "House Keys" with "Sara Parker."

Figure 8B:
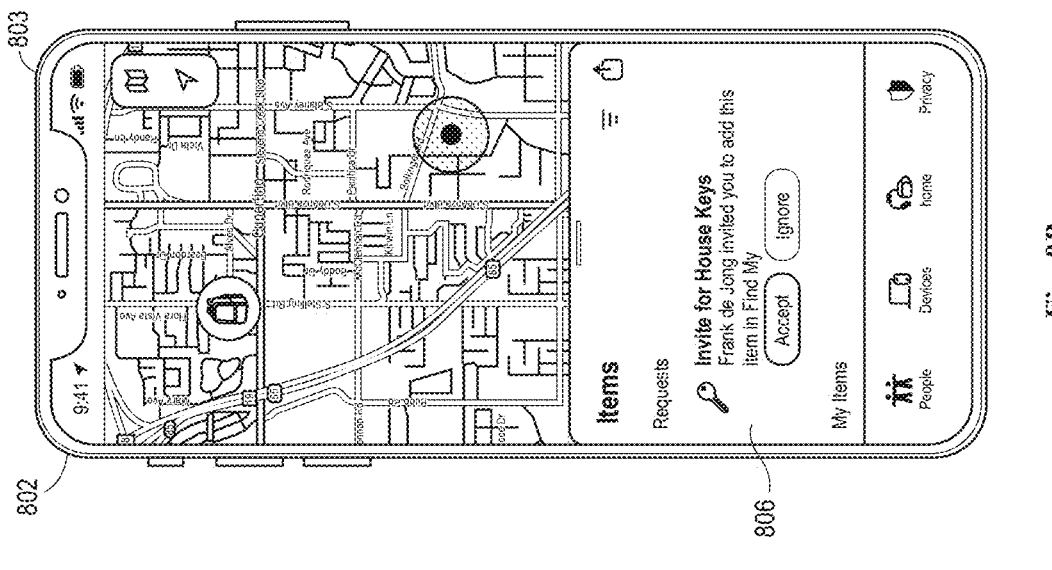
Figure 8A:
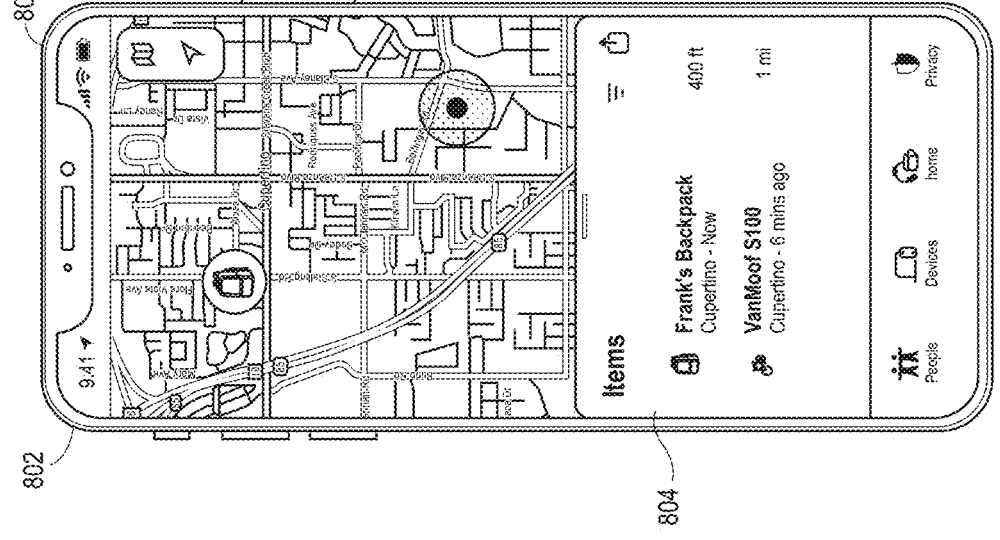
Figure 8D:
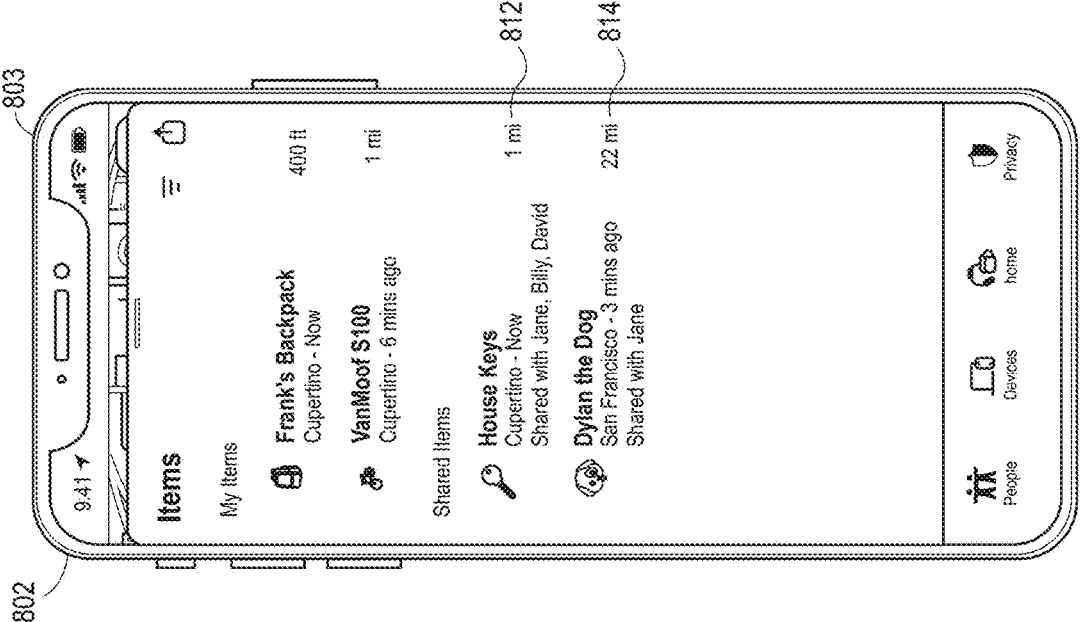
Figure 8C:
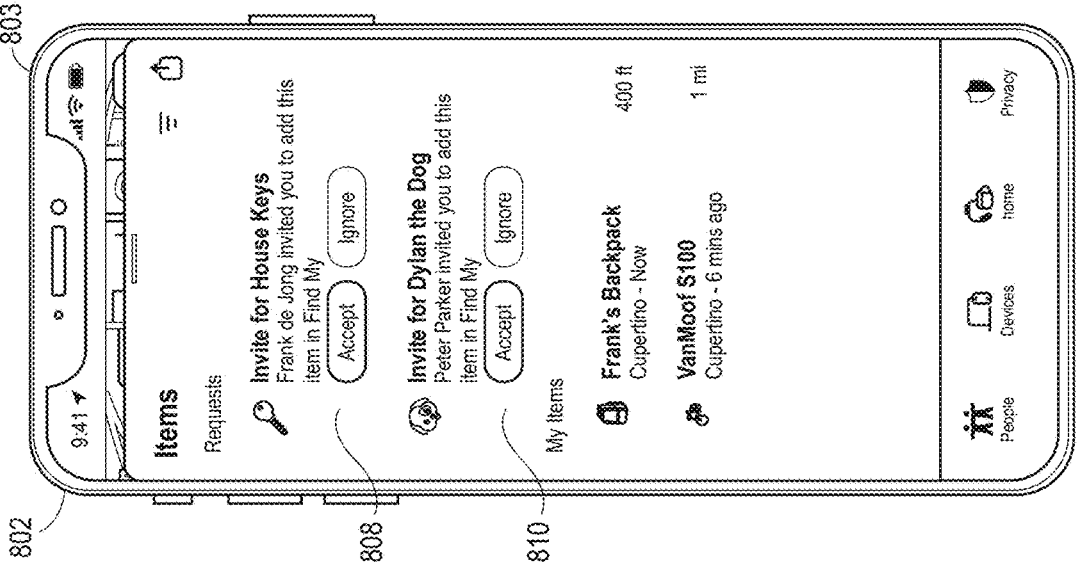
Figure 9B:
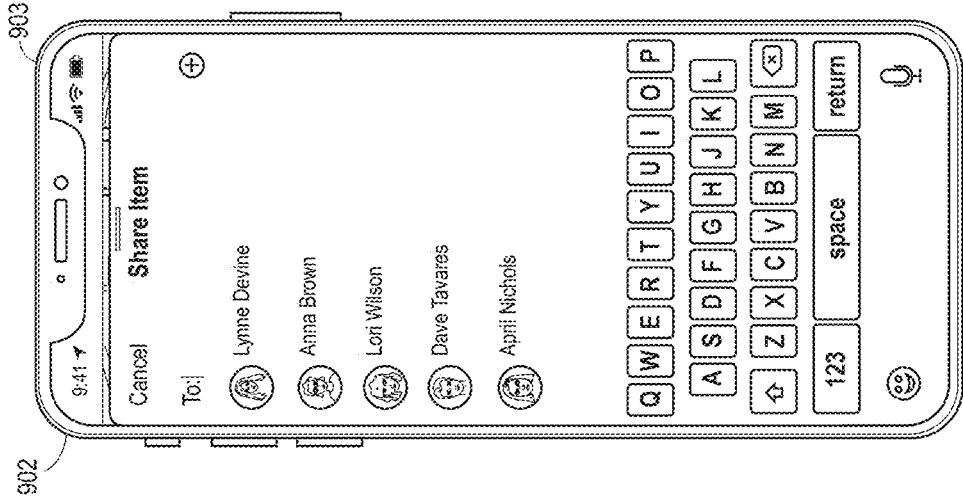
Figure 9A:
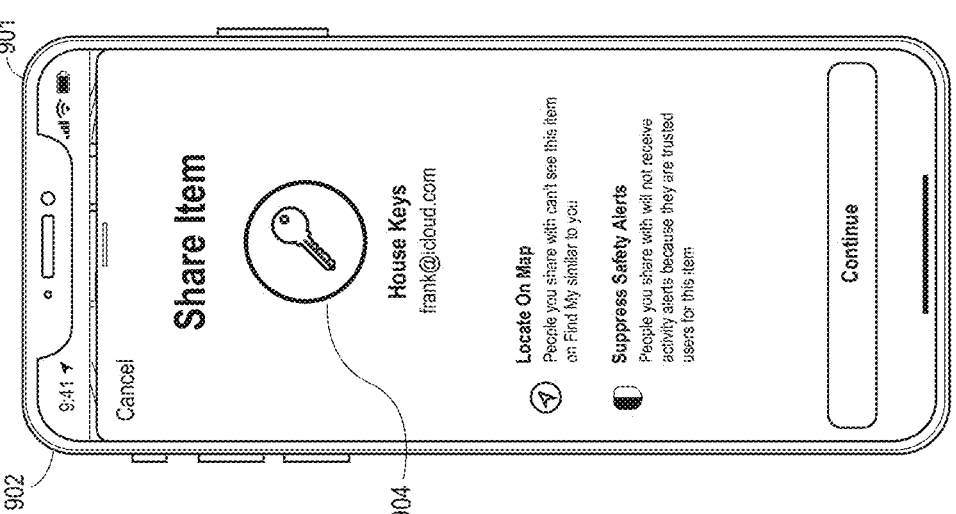
Figure 9D:
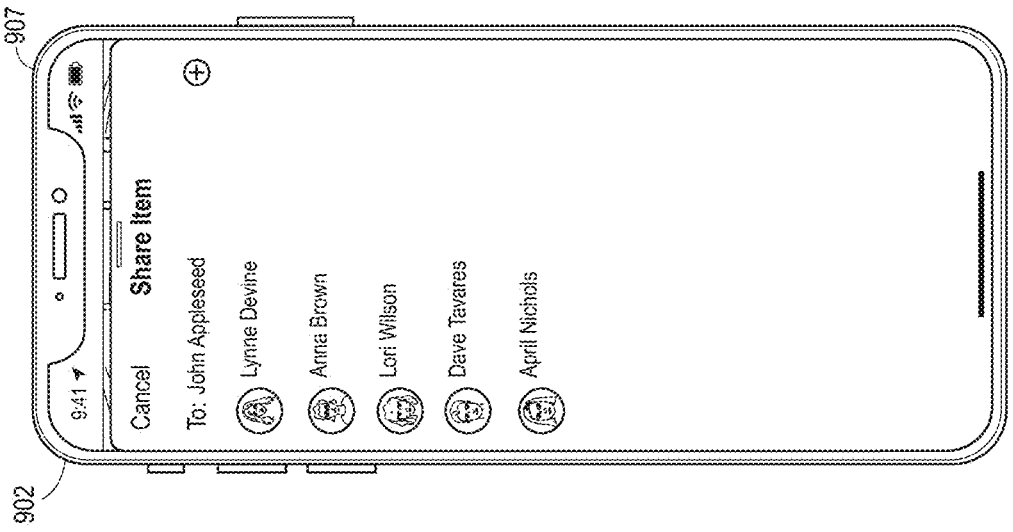
Figure 9C:
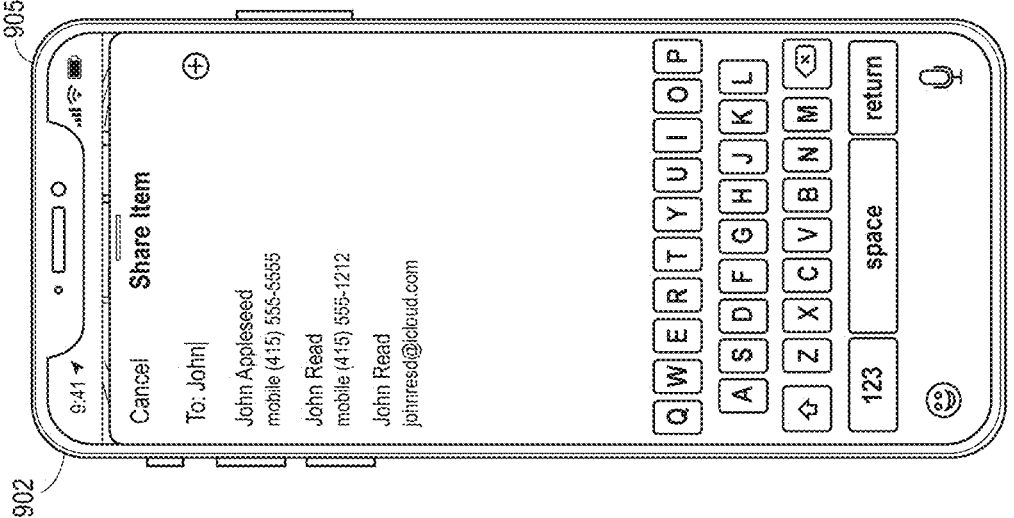

As shown in FIG. 8A, the device locator UI 803 of an owner device can present a graphical user interface on electronic device 802 with accessory device location for an accessory device associated with an item 804 "Frank's Backpack" and location information is presented as shown with item "Frank's Backpack" located within a map relative to the owner's position within the map. As shown in FIG. 8B, the device locator UI 803 can present a graphical user interface in electronic device 802 with a request from another owner "Frank de Jong" (or a sharee with a capability to share another owner's accessory device) 806 to become a sharee for item "House Keys." As shown in FIG. 8C, the device locator UI 803 can present a graphical user interface in electronic device 802 with a request from another owner "Frank de Jong" (or a sharee with a capability to share another owner's accessory device) 808 to become a sharee for item "House Keys" and a request from "Peter Parker" 810 to share an accessory device associated with "Dylan the Dog." As shown in FIG. 8D, the device locator UI 803 can present a graphical user interface on electronic device 802 with shared "House Keys" 812 in addition to sharees (e.g., "Jane," "Billy," and "David") for the shared item and an accessory device associated with "Dylan the Dog" 814 in addition to sharee (e.g., "Jane"). Each sharee of "House Keys" and accessory device associated with "Dylan the Dog" agreed to an access policy to share their names with the sharee of the shared items illustrated in FIG. 8D. As shown in FIG. 9A, the device locator UI 901 can present a graphical user interface on electronic device 902 with interface to create a share request for "House Keys" 904 to potential sharees (e.g., contacts "Lynne Devine," "Anna Brown," "Lori Wilson") as shown in FIG. 9B. and an accessory device associated with "Dylan the Dog" 814 in addition to sharee (e.g., "Jane"). As shown in FIG. 9C, the device locator UI 905 can present a graphical user interface on electronic device 902 to create a share request for "House Keys" with contacts (e.g., "John Appleseed" and "John Read") and in FIG. 9D, with device locator UI 907, multiple sharee contacts can be selected for the share request.

FIG. 10 illustrates a flowchart 1000 for a method to enable location services for a target accessory device, according to an embodiment. As shown in FIG. 10, method 1000 includes an operation in which an electronic device launches a device locator UI (1001). In response to launching the device locator UI, the electronic device, which can be a mobile device as described herein, or another electronic device associated with the same cloud services account as the mobile electronic device, can perform an operation to obtain location information that was included within a beacon signal broadcast by a wireless accessory during a first period (1002). In the case of an owner device 502, the electronic generate a set of public keys that were included within a beacon signal broadcast by a wireless accessory during a first period. The first period can be, for example, a previous 24 hours. In another example, the first period is a 15 minute privacy window. Alternatively, in the case of a sharee device 504, encrypted location information is obtained from the device locator server 534 (1003) on demand when the sharee device 504 sends a request with metadata and a decryption key for hashes of public keys within the key period. The owner electronic device is aware of the frequency in which the wireless accessory is to generate new public keys and, using a shared secret generated with the wireless accessory, can generate a set of public keys that correspond with the keys that were generated by the wireless accessory over the first period. The owner electronic device 502 can provide the generated keys at the device location server 520 for retrieval by the sharee device 504. The sharee electronic device 504 can then send a decryption key for encrypted hashed public keys within a request for the device locator server to send location data that corresponds with the set of hashed public keys. In one embodiment, location data sent by the server in response to the request will be encrypted using the public key transmitted as the beacon identifier of the wireless accessory. The sharee electronic device 504 can decrypt the encrypted location data received by the device location server using the private key provided by the delegate server (1003). The sharee electronic device 504 can then process the location data to determine the highest probability location for the wireless accessory (1004). The process can continue by obtaining location information during a next period (1002).

Figure 14:
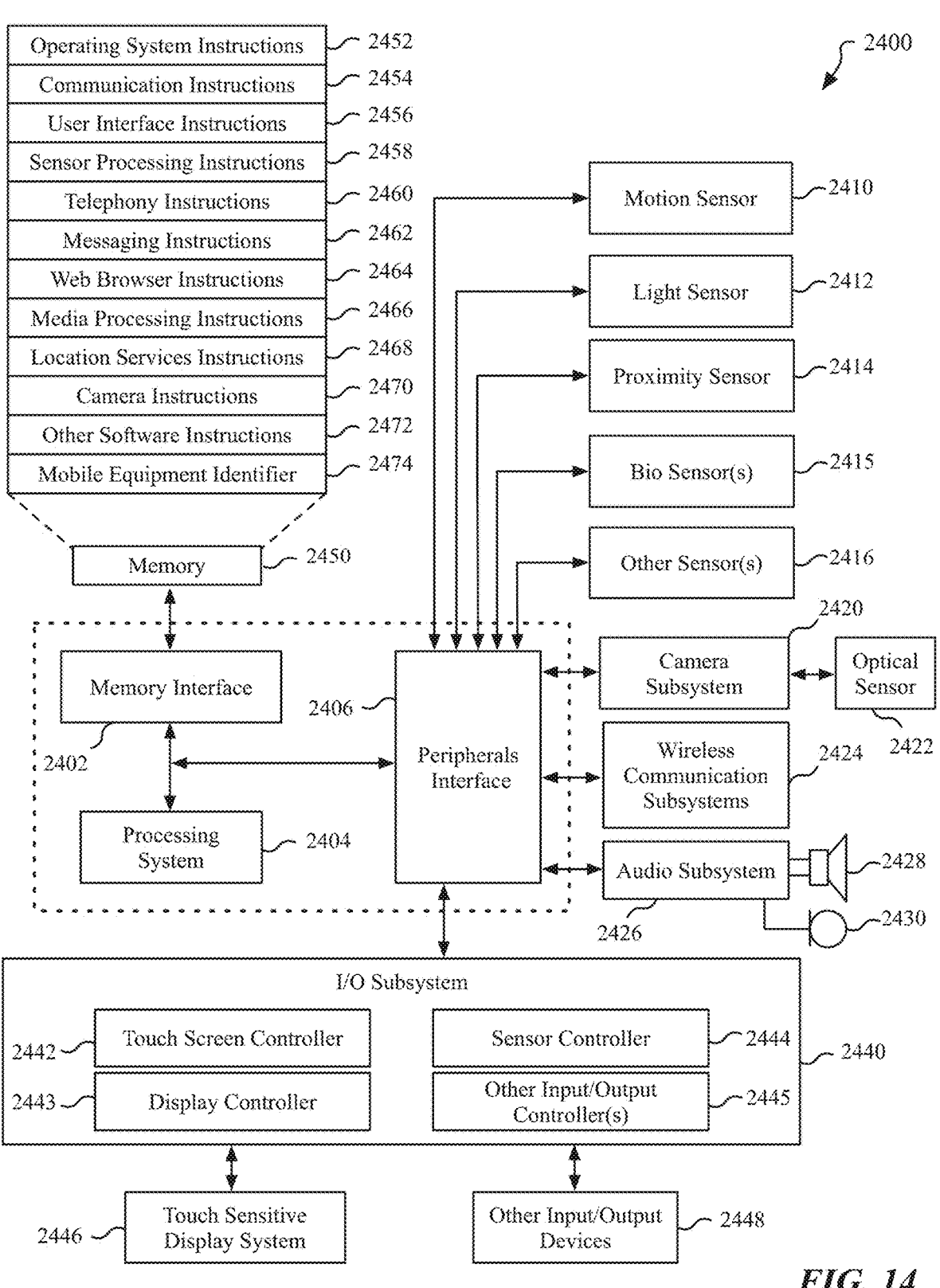
FIG. 14 is a block diagram of a device architecture for a mobile or embedded device, according to an embodiment.

Processing the location data can include a variety of different operations. In one embodiment the location data includes latitude and longitude information along with a timestamp for which the location was determined. The electronic device can triangulate based on the timestamps and remove noise or outlier locations. In one embodiment the location data specifies the location of the finder device that detected the beacon. The location data can additionally include UWB ranging information and/or RSSI information for the beacon detected by the finder device. The electronic device can analyze the UWB ranging information and/or RSSI information in context with the device locations to develop a more accurate location for the wireless accessory. Data that can be transmitted by a finder device and used for location processing is shown in FIG. 14 and described below.

Figure 11A:
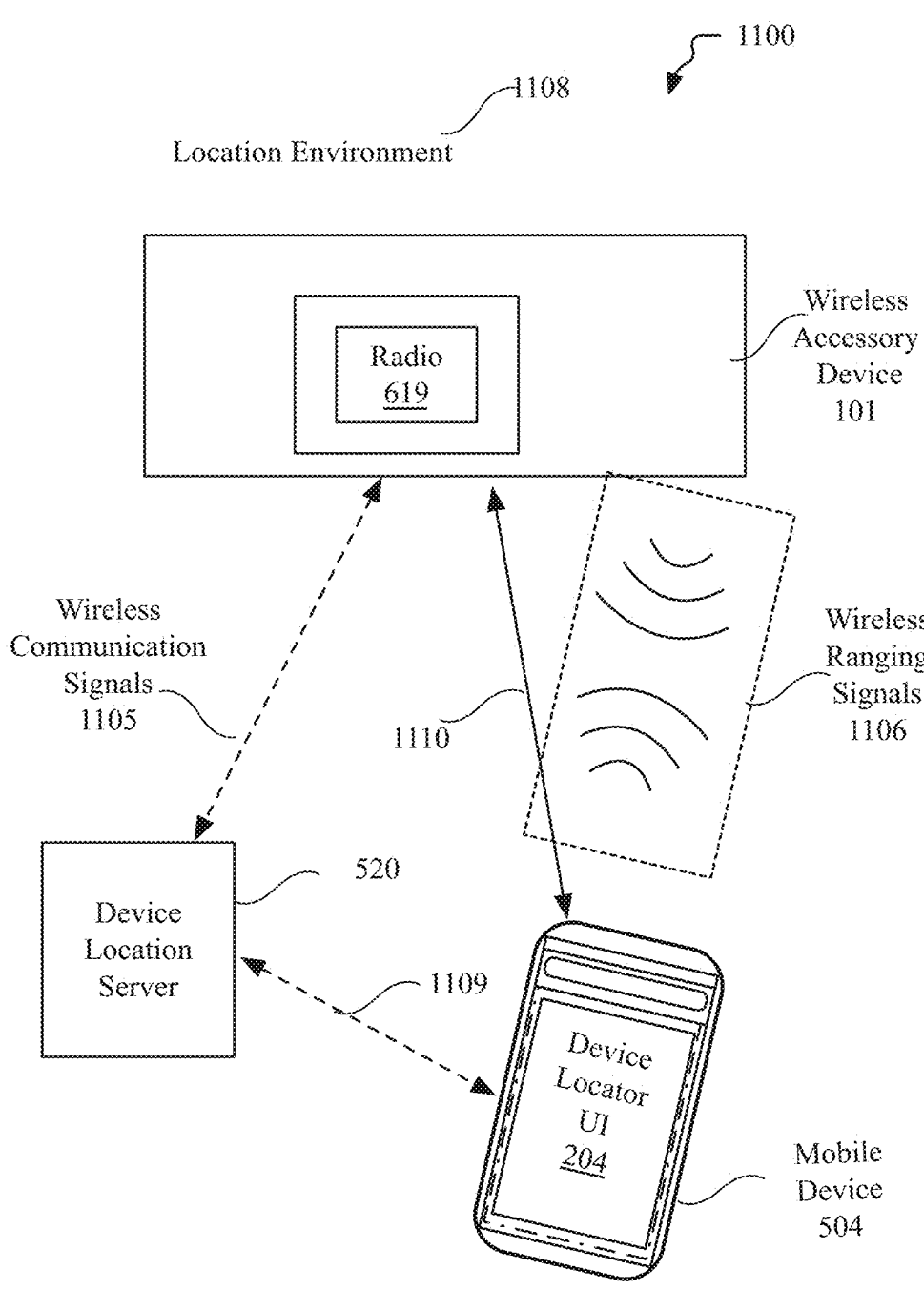
FIG. 11A is an operating environment for electronic devices, according to an embodiment.

FIG. 11A is an operating environment 800 for electronic devices, according to an embodiment. The devices 101 and 504 can communicate wirelessly via wireless communication signals 605 and detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). In location environment 1108, mobile sharee device 504 may receive detect a beacon signal from wireless accessory 101. The wireless communication signals 1110 can be carrier signals that conform to wireless communication technologies such as, but not limited to Wi-Fi or BLUETOOTH. In addition to wireless communication, the mobile device 504, smart home device(s) 107, and/or the wireless accessory device 101 perform wireless ranging operations using wireless ranging signals 1106 (as shown between mobile device 504 and wireless accessory device 101). The wireless ranging signals can be, for example, ultra-wideband signals that can be used to determine a distance and/or angle between the wireless accessory device 101 and the mobile device 504 using techniques described herein.

In one embodiment, the wireless accessory 101 can periodically transmit a wireless beacon signal. The wireless accessory 101 can transmit the beacon signal using one of a variety of wireless technologies described herein (e.g., BLUETOOTH, Wi-Fi, etc.) and in one embodiment can also beacon using an ultra-wide band (UWB) radio technology. The beacon signal can be transmitted using a single wireless technology, one of multiple selectable wireless technologies, or multiple simultaneous wireless technologies. The beacon signal can transmit a beacon identifier that includes information to specifically identify the individual wireless accessory 101, and/or a device group. In one embodiment, the beacon identifier is a public encryption key associated with the wireless accessory device.

Figure 11B:
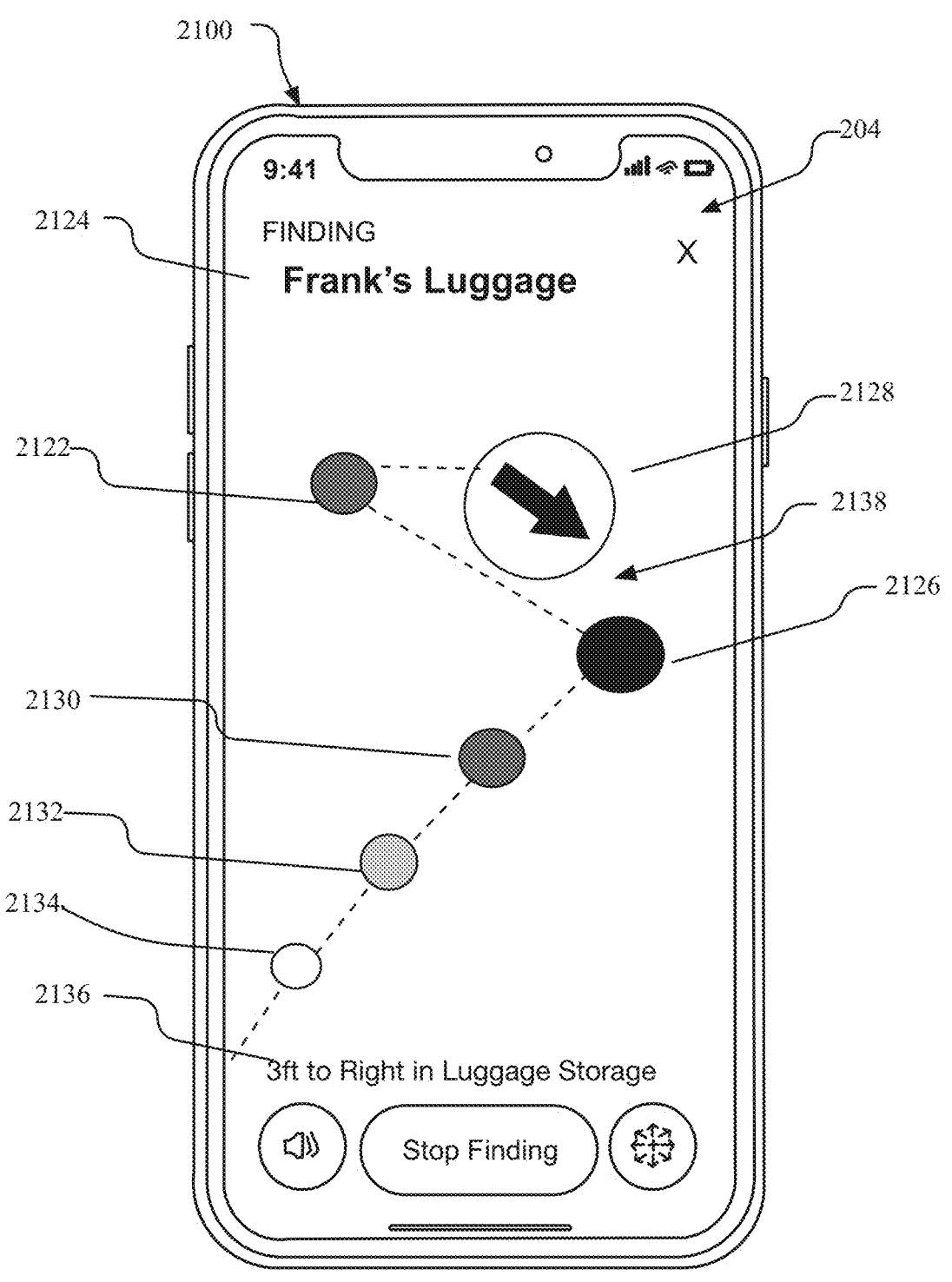
Figure 12:
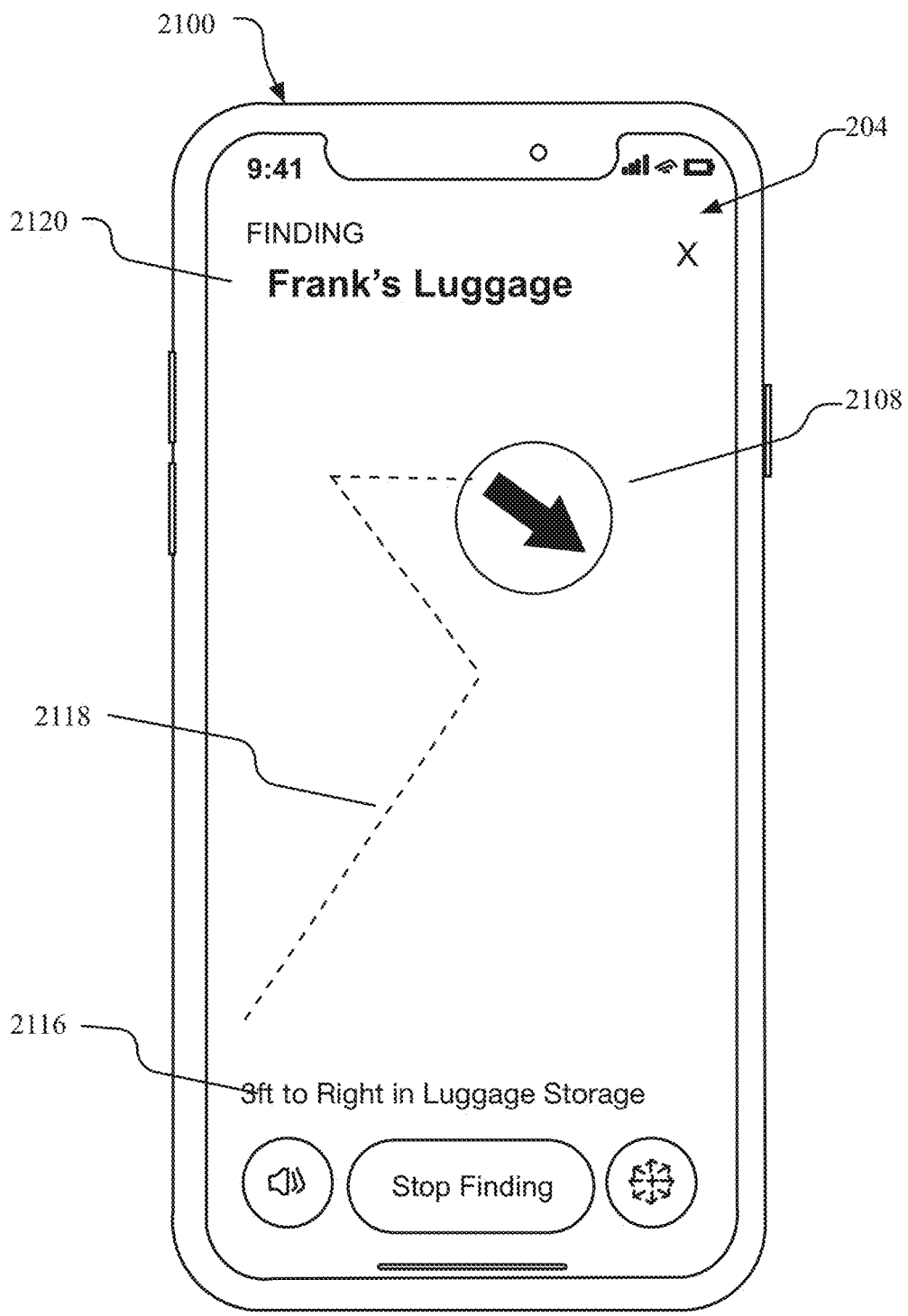

The sharee device 504 may send a request to device location server 520 for at least one of the following location services capabilities: request to update the wireless accessory device location along the expected route with delegate entity, play sound on the wireless accessory, and/or locate the wireless accessory device using locator finding as described with FIG. 11B and FIG. 12. If the conditions are satisfied for the share device 504 and the authenticated user of the sharee device 504, then the sharee device 504 may use device locator services. By way of example, if the authenticated sharee has a location finding capability, then the sharee device 504 may send a request for locator services.

As shown in FIG. 11B, the device locator UI 204 can present a graphical user interface in electronic device 2100 with a proximity view using signal strength measurements. The proximity view 2124 for finding "Frank's Luggage" has indicators 2122, 2126, 2130, 2132, 2134, and 2128 at various positions along the trajectory 2138 within the user interface 204. Each indicator may be user interface element that represent proximity to target wireless accessory device 101 by size, color, shape, color gradient, shading, pattern, and/or any other technique for a visual indicator within a user interface. The indicators may be displayed along the trajectory 2138 as the user moves through the location environment. In the proximity view 2104, for example, indicator 2106 is closest to the target wireless accessory device 101 along the trajectory 2138 that the user has taken to find the target wireless accessory device 101 as represented by a darker color and/or a larger size as compared to the other indicators. In some embodiments, user interface 204 proximity view may present ranging information using ranging measurements and present an arrow 2128 indicating the direction of the target wireless accessory device 101 and the distance 2136 to the target wireless accessory device 101. In other embodiments, the trajectory may be shown in a grid, such as a hexagonal grid, with visual indicators consisting of areas of the grid designated with colors, gradients, shading, and/or any other marking along the trajectory plotted on the grid to represent the proximity values for signal strength observed in the respective areas by the mobile device 102, smart home device, and/or combination thereof.

In an embodiment, signal strength measurements from signals received at the mobile device 102 may be used to represent proximity to the target device within the user interface to indicate when the mobile device 102 is proximate to the target device. In some embodiments, signal strength information for the smart home device along the trajectory may be used to present proximity indicators. A "proximity view" 2104 as shown in FIG. 12 may present proximity information using visualization techniques to present the proximity information in relation to a target wireless accessory device 101. In an embodiment, the proximity view 2104 has visual indicators, such as user interface elements, positioned along a trajectory 2118 presented within the user interface 204 to represent a path the user has taken in their search. In some embodiments, the visual indicators may be user interface elements displayed with a gradient, a color, a color gradient, a size, a shape, and/or any other visualization technique to represent signal strength values and a corresponding defined proximity category (e.g., far, near, close, etc.) to the target device. The proximity view 2104 for finding "Frank's Luggage" has indicators 2102, 2106, 2110, 2112, and 2114 at various positions along the trajectory 2118 within the user interface 204. Each indicator in proximity view 2104 may be a user interface element that represents proximity to the target wireless accessory device by size and color gradient within the user interface 204. In the proximity view 2104, for example, indicator 2106 is closest to the target wireless accessory device along the trajectory 2118 that the user has taken to find the target wireless accessory device as represented by a darker color and/or a larger size as compared to the other indicators (e.g., 2102, 2110, 2112, and 2114). Embodiments may use visual inertial odometry (VIO) measurements to determine the trajectory 2118 that a user has taken in their search within the user interface 204. VIO provides the ability to track movement of a mobile device 102 in an arbitrary initial coordinate system. VIO techniques include the analysis of a sequence of images collected with the mobile device to estimate camera motion over the sequence of images.

In some embodiments, the mobile device 102 may move to be within a threshold range of the target accessory device 101 allowing for a ranging process using communication between the mobile device and the target device to determine a distance from and direction to the target device. As shown in FIG. 12, a "ranging view" 2120 of the user interface 204 may provide a distance measurement 2116 in addition to the direction 2108 to the target device that may be selectively displayed. The proximity view 2104 for finding the target device may be used when ranging data for a ranging view 2120 is not available due to a target device not being within a threshold range of the mobile device 102, a target device 101 transmitter not being in a field of view of a receiver at the mobile device, and/or a mobile device does not have a nearly unobstructed view to the target device 101, in some embodiments. The target device 101 may be in the field of view of the mobile device 102 when the receiver at the mobile device 102 has a view of the target device transmitter.

In some embodiments, ranging using an ultra-wide band (UWB) radio technology may provide relatively precise location or distance data to a target device, but are a relatively short-range radio frequency (RF) technology wireless communication as compared to BLUETOOTH technology. In some embodiments, it may be desirable for the mobile device 102 UWB receiver to have line of sight to the target device transmitter or a nearly unobstructed view of the target device to obtain optimal ranging location data. Proximity information in the form of signal strength information may be relatively less precise in comparison to UWB but may cover a wider area offering a longer range and can be obtained from advertisements before the wireless radio connection is established. Bi-directional communication may not be established with a connection between the mobile device and target device, but advertisements received at the mobile device may provide signal strength information to aid in directing the user to the target device prior to establishing a connection, in some embodiments. The combination of techniques may assist the user in locating the target wireless accessory device.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

In various embodiments, description is made with reference to figures. However, certain embodiments may be practiced without one or more of these specific details, or in combination with other known methods and configurations Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

FIG. 13 is a block diagram illustrating an exemplary API architecture, which may be used in some embodiments of the invention. As shown in FIG. 13, the API architecture 2300 includes the API-implementing component 2310 (e.g., an operating system, a library, a device driver, an API, an application program, software or other module) that implements the API 2320. The API 2320 specifies one or more functions, methods, classes, objects, protocols, data structures, formats and/or other features of the API-implementing component that may be used by the API-calling component 2330. The API 2320 can specify at least one calling convention that specifies how a function in the API-implementing component receives parameters from the API-calling component and how the function returns a result to the API-calling component. The API-calling component 2330 (e.g., an operating system, a library, a device driver, an API, an application program, software or other module), makes API calls through the API 2320 to access and use the features of the API-implementing component 2310 that are specified by the API 2320. The API-implementing component 2310 may return a value through the API 2320 to the API-calling component 2330 in response to an API call.

Figure 18:
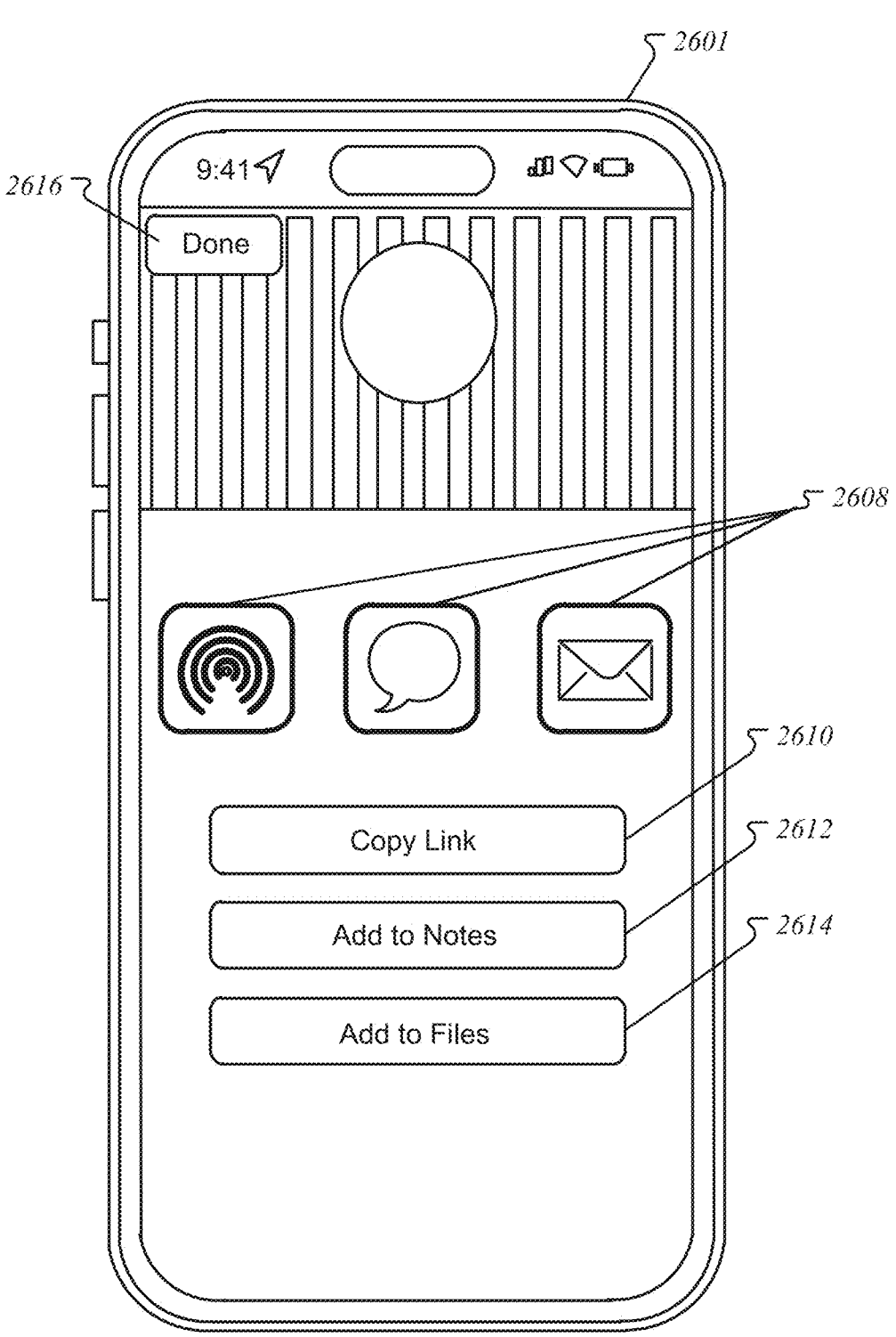

It will be appreciated that the API-implementing component 2310 may include additional functions, methods, classes, data structures, and/or other features that are not specified through the API 2320 and are not available to the API-calling component 2330. It should be understood that the API-calling component 2330 may be on the same system as the API-implementing component 2310 or may be located remotely and accesses the API-implementing component 2310 using the API 2320 over a network. While FIG. 18 illustrates a single API-calling component 2330 interacting with the API 2320, it should be understood that other API-calling components, which may be written in different languages (or the same language) than the API-calling component 2330, may use the API 2320.

The API-implementing component 2310, the API 2320, and the API-calling component 2330 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

FIG. 14 is a block diagram of a device architecture 2400 for a mobile or embedded device, according to an embodiment. The device architecture 2400 includes a memory interface 2402, a processing system 2404 including one or more data processors, image processors and/or graphics processing units, and a peripherals interface 2406. The various components can be coupled by one or more communication buses or signal lines. The various components can be separate logical components or devices or can be integrated in one or more integrated circuits, such as in a system on a chip integrated circuit.

The memory interface 2402 can be coupled to memory 2450, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 2406 to facilitate multiple functionalities. For example, a motion sensor 2410, a light sensor 2412, and a proximity sensor 2414 can be coupled to the peripherals interface 2406 to facilitate the mobile device functionality. One or more biometric sensor(s) 2415 may also be present, such as a fingerprint scanner for fingerprint recognition or an image sensor for facial recognition. Other sensors 2416 can also be connected to the peripherals interface 2406, such as a positioning system (e.g., GPS receiver), a temperature sensor, or other sensing device, to facilitate related functionalities. A camera subsystem 2420 and an optical sensor 2422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2424, which can include radio frequency receivers and transmitters and/or optical (e.g., infrared) receivers and transmitters. The specific design and implementation of the wireless communication subsystems 2424 can depend on the communication network(s) over which a mobile device is intended to operate. For example, a mobile device including the illustrated device architecture 2400 can include wireless communication subsystems 2424 designed to operate over a GSM network, a CDMA network, an LTE network, a Wi-Fi network, a BLUETOOTH network, or any other wireless network. In particular, the wireless communication subsystems 2424 can provide a communications mechanism over which a media playback application can retrieve resources from a remote media server or scheduled events from a remote calendar or event server.

An audio subsystem 2426 can be coupled to a speaker 2428 and a microphone 2430 to facilitate voice-enabled functions, such as voice recognition, voice replication, digital recording, and telephony functions. In smart media devices described herein, the audio subsystem 2426 can be a high-quality audio system including support for virtual surround sound.

The I/O subsystem 2440 can include a touch screen controller 2442 and/or other input controller(s) 2445. For computing devices including a display device, the touch screen controller 2442 can be coupled to a touch sensitive display system 2446 (e.g., touch-screen). The touch sensitive display system 2446 and touch screen controller 2442 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 2446. Display output for the touch sensitive display system 2446 can be generated by a display controller 2443. In one embodiment, the display controller 2443 can provide frame data to the touch sensitive display system 2446 at a variable frame rate.

In one embodiment, a sensor controller 2444 is included to monitor, control, and/or processes data received from one or more of the motion sensor 2410, light sensor 2412, proximity sensor 2414, or other sensors 2416. The sensor controller 2444 can include logic to interpret sensor data to determine the occurrence of one of more motion events or activities by analysis of the sensor data from the sensors.

In one embodiment, the I/O subsystem 2440 includes other input controller(s) 2445 that can be coupled to other input/control devices 2448, such as one or more buttons, rocker switches, thumb-wheel, infrared port, USB port, and/or a pointer device such as a stylus, or control devices such as an up/down button for volume control of the speaker 2428 and/or the microphone 2430.

In one embodiment, the memory 2450 coupled to the memory interface 2402 can store instructions for an operating system 2452, including portable operating system interface (POSIX) compliant and non-compliant operating system or an embedded operating system. The operating system 2452 may include instructions for handling basic system services and for performing hardware dependent tasks. In some implementations, the operating system 2452 can be a kernel.

The memory 2450 can also store communication instructions 2454 to facilitate communicating with one or more additional devices, one or more computers and/or one or more servers, for example, to retrieve web resources from remote web servers. The memory 2450 can also include user interface instructions 2456, including graphical user interface instructions to facilitate graphic user interface processing.

Additionally, the memory 2450 can store sensor processing instructions 2458 to facilitate sensor-related processing and functions; telephony instructions 2460 to facilitate telephone-related processes and functions; messaging instructions 2462 to facilitate electronic-messaging related processes and functions; web browser instructions 2464 to facilitate web browsing-related processes and functions; media processing instructions 2466 to facilitate media processing-related processes and functions; location services instructions including GPS and/or navigation instructions 2468 and Wi-Fi based location instructions to facilitate location based functionality; camera instructions 2470 to facilitate camera-related processes and functions; and/or other software instructions 2472 to facilitate other processes and functions, e.g., security processes and functions, and processes and functions related to the systems. The memory 2450 may also store other software instructions such as web video instructions to facilitate web video-related processes and functions; and/or web shopping instructions to facilitate web shopping-related processes and functions. In some implementations, the media processing instructions 2466 are divided into audio processing instructions and video processing instructions to facilitate audio processing-related processes and functions and video processing-related processes and functions, respectively. A mobile equipment identifier, such as an International Mobile Equipment Identity (IMEI) 2474 or a similar hardware identifier can also be stored in memory 2450.

Each of the above identified instructions and applications can correspond to a set of instructions for performing one or more functions described above. These instructions need not be implemented as separate software programs, procedures, or modules. The memory 2450 can include additional instructions or fewer instructions. Furthermore, various functions may be implemented in hardware and/or in software, including in one or more signal processing and/or application specific integrated circuits.

Figure 15:
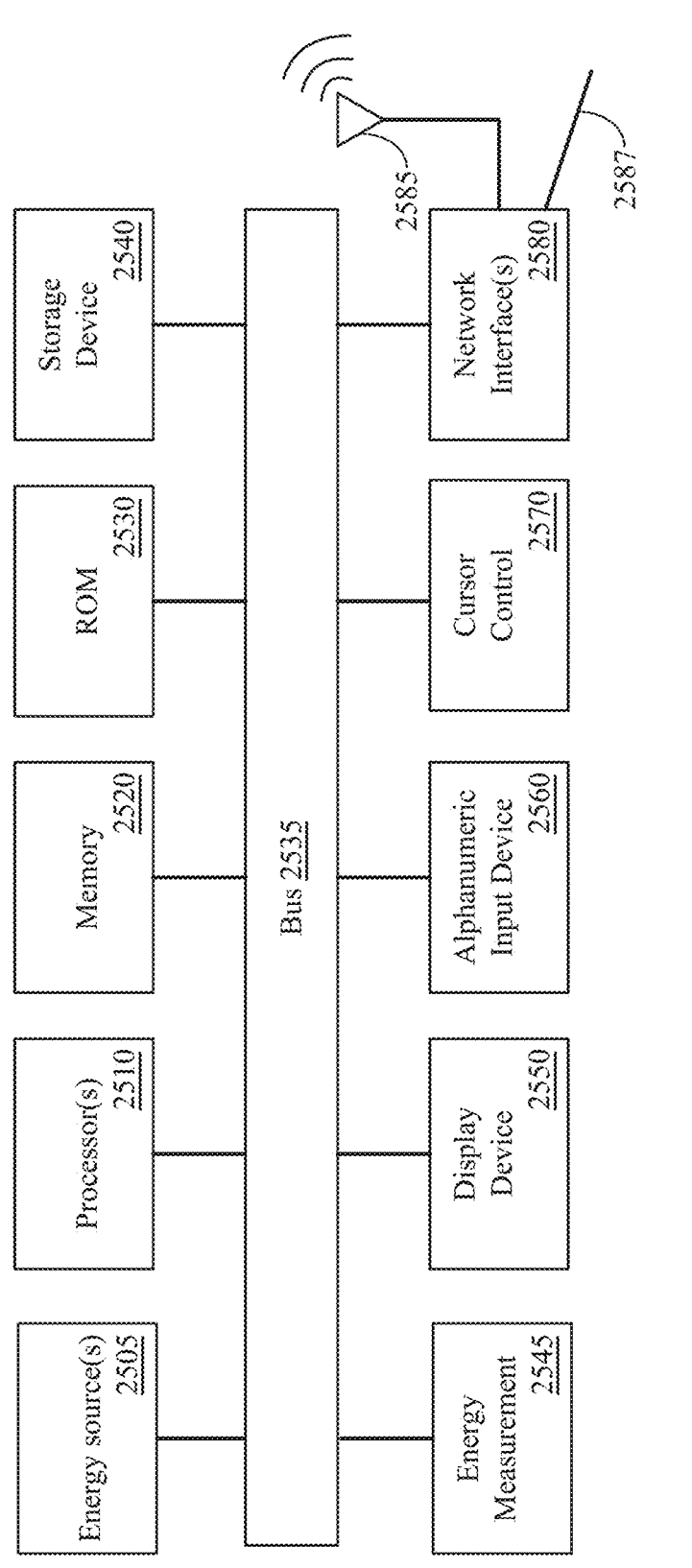
FIG. 15 is a block diagram of a computing system, according to an embodiment.

FIG. 15 is a block diagram of a computing system 2500, according to an embodiment. The illustrated computing system 2500 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 2500 can be used to provide the computing device and/or a server device to which the computing device may connect.

The computing system 2500 includes bus 2535 or other communication device to communicate information, and processor(s) 2510 coupled to bus 2535 that may process information. While the computing system 2500 is illustrated with a single processor, the computing system 2500 may include multiple processors and/or co-processors. The computing system 2500 further may include memory 2520 in the form of random access memory (RAM) or other dynamic storage device coupled to the bus 2535. The memory 2520 may store information and instructions that may be executed by processor(s) 2510. The memory 2520 may also be main memory that is used to store temporary variables or other intermediate information during execution of instructions by the processor(s) 2510.

The computing system 2500 may also include read only memory (ROM) 2530 and/or another data storage device 2540 coupled to the bus 2535 that may store information and instructions for the processor(s) 2510. The data storage device 2540 can be or include a variety of storage devices, such as a flash memory device, a magnetic disk, or an optical disc and may be coupled to computing system 2500 via the bus 2535 or via a remote peripheral interface.

The computing system 2500 may also be coupled, via the bus 2535, to a display device 2550 to display information to a user. The computing system 2500 can also include an alphanumeric input device 2560, including alphanumeric and other keys, which may be coupled to bus 2535 to communicate information and command selections to processor(s) 2510. Another type of user input device includes a cursor control 2570 device, such as a touchpad, a mouse, a trackball, or cursor direction keys to communicate direction information and command selections to processor(s) 2510 and to control cursor movement on the display device 2550. The computing system 2500 may also receive user input from a remote device that is communicatively coupled via one or more network interface(s) 2580.

The computing system 2500 further may include one or more network interface(s) 2580 to provide access to a network, such as a local area network. The network interface(s) 2580 may include, for example, a wireless network interface having antenna 2585, which may represent one or more antenna (e). The computing system 2500 can include multiple wireless network interfaces such as a combination of Wi-Fi, BLUETOOTH®, near field communication (NFC), and/or cellular telephony interfaces. The network interface(s) 2580 may also include, for example, a wired network interface to communicate with remote devices via network cable 2587, which may be, for example, an Ethernet cable, a coaxial cable, a fiber optic cable, a serial cable, or a parallel cable.

In one embodiment, the network interface(s) 2580 may provide access to a local area network, for example, by conforming to IEEE 802.11 wireless standards and/or the wireless network interface may provide access to a personal area network, for example, by conforming to BLUETOOTH standards. Other wireless network interfaces and/or protocols can also be supported. In addition to, or instead of, communication via wireless LAN standards, network interface(s) 2580 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 2500 can further include one or more energy sources 2505 and one or more energy measurement systems 2545. Energy sources 2505 can include an AC/DC adapter coupled to an external power source, one or more batteries, one or more charge storage devices, a USB charger, or other energy source. Energy measurement systems include at least one voltage or amperage measuring device that can measure energy consumed by the computing system 2500 during a predetermined period of time. Additionally, one or more energy measurement systems can be included that measure, e.g., energy consumed by a display device, cooling subsystem, Wi-Fi subsystem, or other frequently used or high-energy consumption subsystem.

FIG. 16 is a flow diagram illustrating methods for use with device locator systems, according to an embodiment. A sharee device 504 may receive a share resource locator directly from an owner device 502 (or another sharee device) using any number of communication methods, third party server (such as via a third-party application), and/or a delegate server 534. For example, the owner device 502 or sharee device 504 may send the share resource locator in an electronic message, text message, via a QR code, via a third-party application, file synchronization services, word processing application, note-taking application, file transfer services, cloud-based storage, and/or any other form of communication the share resource locator.

In flow diagram 1600, device locator server 520 receives a share resource locator request from sharee device 504 to access a locator service accessible at a device locator server 520 for an accessory device 530 shared by owner device 502. The owner device 502 may enable the share, and receipt of the share resource locator request to access the share with the share resource locator may begin the delegation. Continuing with the flow diagram 1600, the device locator server 520 may receive a share resource locator request to access a location service for an accessory device (1602). The sharee device 504 may access the share by sending a request to the device locator server 520 via an application with the share resource locator, such as selecting to access the share device locator by submitting a request with a web browser. In an embodiment, the sharee/delegate device 504 that is a sub-delegate of a delegate entity may access the share using the share resource locator with a third-party application via the third-party server.

The share resource locator includes a unique identifier that corresponds to an identifier for the share that may be looked up with the unique identifier and accessed via the device locator server 520. The share resource locator may resolve to a web page and/or web application to access the share. In an embodiment, a single share resource locator may be used to access the share by both a delegate device 504 for sub-delegate of a delegate entity and/or a sharee device 504 of a user unaffiliated with a delegate entity. The share resource locator may be shared to both users and delegate entities. In an embodiment, the share resource locator is a unique identifier for a resource (e.g., the address for a web page that may be used to access the share). In an embodiment, the share identifier corresponds to the share and delegate keys stored at the delegate server 534.

As indicated herein, the user of the owner device 502, via a delegation UI 503, can delegate all or a subset of device locator server 520 services to the delegate entity via a transfer 505 of delegate keys to a share record established on the delegate server 534 for the delegate entity. The owner device 502 user can enable or disable the share at any time. Delegation can be performed by the owner device 502 by generating keys for one or more privacy windows expected for the duration and providing those keys to the delegate server 534 via the transfer 505 of delegate keys. The privacy window is a predefined period of time, such as M minutes, that a set of generated keys associated with the wireless accessory 530 are valid. In an embodiment, there is at least one new key for each privacy window. For example, if the duration of travel is expected to be an hour and the privacy window is 15 minutes, then the set of generated keys for the privacy window (e.g., 15 minutes) within the hour will include at least 4 keys. The delegate server 534 may store the delegate keys in a share record in a share database, and the delegate server 534 may encrypt and decrypt data exchanged with the device locator server 520 in response to requests by the sharee device 504.

The share resource locator may also include a cryptographic key and/or a delegate shared secret to generate a cryptographic key. The cryptographic key may be used by the sharee device 504 to encrypt/decrypt data received in response to requests for device locator services and/or the owner device 502. In some embodiments, the delegate device 504 associated with a delegate entity (e.g., a sub-delegate) may obtain the delegate shared secrets and/or cryptographic key from a third-party server. The delegate entity as a trusted entity to the owner device 502 may receive the delegate shared secret and/or cryptographic keys via the third-party application and store the delegate shared secret and/or cryptographic keys at the third-party server. The delegate entity may determine whether delegate shared secrets and/or cryptographic keys are shared directly with a sub-delegate device of a delegate entity or used to decrypt location information within third-party application.

In one embodiment, the share resource locator may be implemented as a uniform resource locator (URL) and the sharee device 504 may access the share of the locator services using the share resource locator with an application, such as a web browser, web application, or a third-party application. Some embodiments may include the shared secret and/or cryptographic key in a portion of the share resource locator string that is only accessed within an application (e.g., a web browser) on the sharee device 504 and the shared secret and/or cryptographic key is not sent with a request to the device locator server 520 with the share resource locator. In this way, the location information may not be shared with the device locator services provider. In some embodiments, the cryptographic key may only be accessed within the application on the sharee device 504 when the request is sent to device locator server 520 (either directly or via the delegate server 534) and a response is received from the device locator server 520 and/or the delegate server 534. For example, the portion of the share resource locator string may be implemented as an anchor link in a uniform resource locator and the anchor link including the cryptographic key may only be accessed within the browser. By way of further example, a URL may be as follows:

"shareurl.com?parameter=1 #cryptographickey", where "shareurl.com" is the address/identifier for the resource, "parameter" is a parameter with a value assigned as 1, and the anchor link follows with "cryptographickey." In another embodiment, a short form URL may be generated for the share resource locator and sent to the sharee device 504.

The device locator server 520 may receive the request directly from the sharee device 504, from the delegate server device 534, and/or a third-party server. The device locator server 520 may request and receive authentication credentials from the sharee device 504 (1604), and the device locator server 520 may attempt to authenticate the sharee device 504 with received authentication credentials. Authentication credentials may include multi-factor authentication types, passkeys, user identifiers and passwords, account identifiers and passwords, out-of-band verification methods (e.g., passcodes sent via messages, text, and/or electronic mail, etc.). In some embodiments, the delegate entity may authenticate the user (e.g., sub-delegate) and the third-party server may provide credentials that indicate the sharee device 504 is authenticated.

Figure 17:
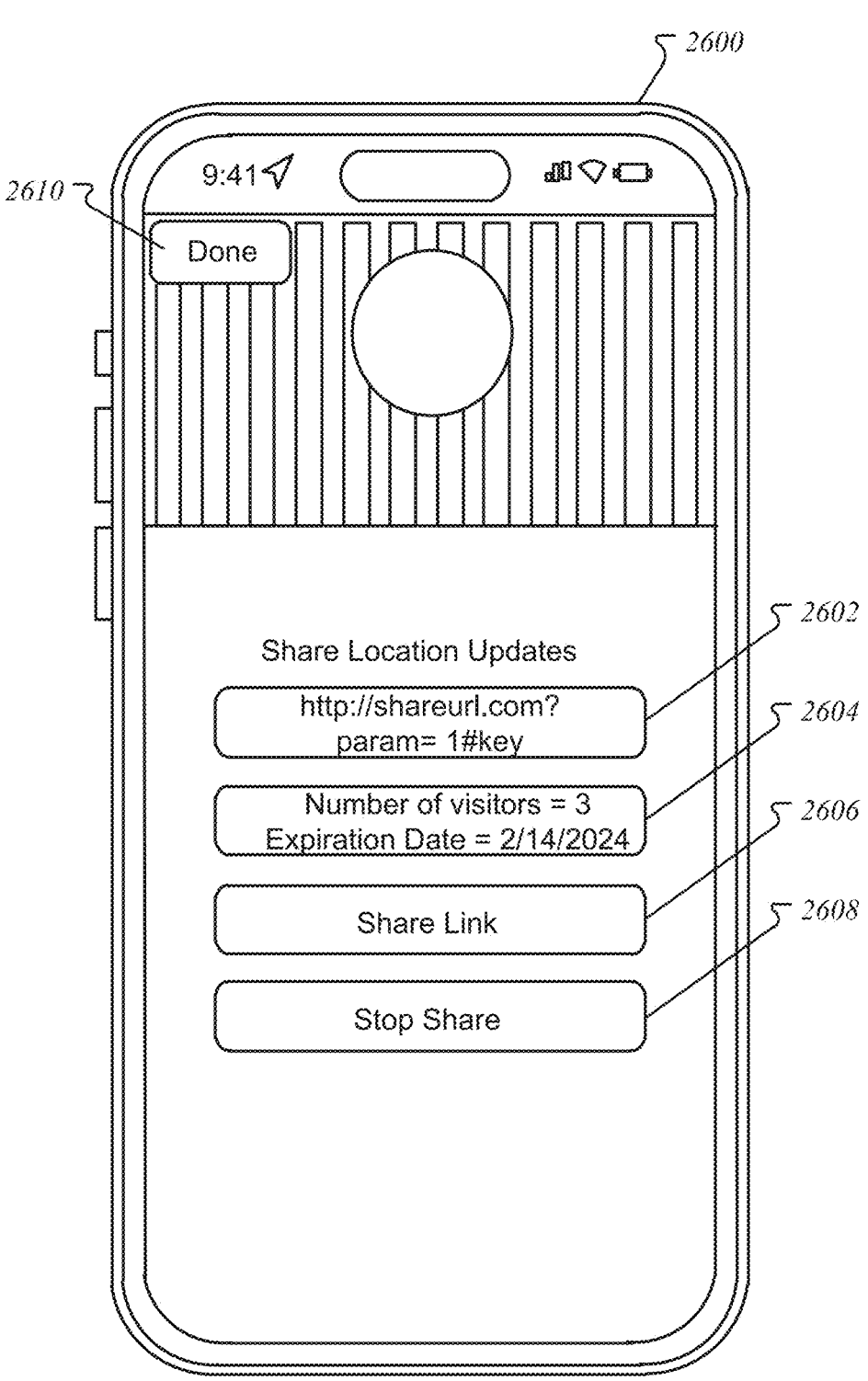
FIGS. 17-18 illustrate delegation user interfaces, according to some embodiments.

If the user of the sharee device 504 is authenticated, then a determination is made as to whether a rate-limit threshold for a number of sharee(s) or sharee request(s) has been exceeded. Rate-limit threshold checks and defined threshold number of user checks may be implemented using techniques to avoid providing user identifiers for the share to the device locator provider. In an embodiment, a hash function is applied to an identifier for the delegate user and/or sharee device 504 to obfuscate the identifier yet allow for recording the share request by the user. The identifier for the delegate user or sharee device 504 may be an account identifier, a device identifier, and/or a phone number, etc. to produce a hash result with the hash function. A comparison is performed between the hash result and existing hash results associated with the share resource locator stored in a database. The database is an organized collection of data. The hash result for the identifier associated with the sharee device 504 is compared to a set of hash results stored in a database associated with the share resource locator. If the comparison results in a match with an existing hash result stored in the database for the share resource locator, then the authenticated user has accessed the share previously and a number of users to the share does not need to be increased. FIG. 17 illustrates a user interface with element 2604 providing a summary of the number or unique users (based on identifiers) to the share. The number of access requests of the share may optionally be recorded.

Alternatively, if the comparison does not result in a match, then the hash result is a unique hash result for the share and indicates it is a new user to the share and the number of visitors value is increased. A unique hash results for the identifier may be stored in association with a share locator resource in a record of the database and a number of unique hash result for the share resource locator may be incremented for each unique hash result to indicate the visit of a new user. If the number of unique hash results received for the resource locator request exceeds or is equal to a rate-limiting threshold value and/or a defined threshold number of permitted share requests, then the received share request may be denied. If the number of unique hash result does not exceed a rate limiting threshold and/or the defined threshold number of permitted share requests, then a unique hash result is added to the hash result database record associated with the share resource locator.

Continuing with the flow diagram, if the number of unique hash results received for the resource locator request does not exceed the rate-limiting threshold or the defined threshold, then metadata is evaluated to determine if conditions are satisfied for a share with the authenticated user of the sharee device (1606). The metadata defines a set of conditions for the share of the set of location services capabilities. In an embodiment, metadata on the owner device 502 associated with the delegate entity and/or selected by the user on the owner device 502 to associate with the share may define a set of conditions. The metadata may define time-bound limits for the share, an access policy for sharees participating in the share for the accessory device 530, and/or any other conditions for the share. The access policy for each sharee participating in a share of location services for the accessory device 530 is established when the sharee accepts a request to participate in the share. The access policy may define when, where, and who the sharee permits to be informed of their respective sharee device location. An authenticated user of the sharee device 504 associated with may access locator services 522 upon request after satisfying a set of conditions. The set of conditions may be established by the device owner and/or the delegate entity. The set of conditions may be for a state of the owner device 502, the status of the wireless accessory 530, the sharee device 504, and/or the authenticated user of the sharee device 504. The set of conditions may be time-based conditions, geo-based conditions, conditions based on status of the wireless accessory 530, and/or location of the owner device 502 or sharee of the owner device (e.g., 504).

In some embodiments, the metadata may identify the expected delegate role, the duration of the share, the expiration time of the share, access policies for location information, and/or any other conditions for a share. For example, the access policies established between sharees and/or owners participating in the share may indicate time frames and/or accessory device status information in which access is permitted or denied. Continuing with the example, the access policy may indicate that an accessory device status of "near owner device" and/or "near sharee device" is not permitted. In an embodiment, the wireless accessory 530 is defined as near to a particular device when the particular device is either wirelessly or physically connected to the wireless accessory 530. In another embodiment, the wireless accessory 530 is defined as near to a particular device (owner device or sharee device) if the particular device is within range to receive a beacon signal range from the wireless accessory 530. For example, the owner device 534 is near to the wireless accessory if the owner device 534 is either wirelessly connected or physically connected to the wireless accessory 530. In another example, a delegate of the delegate entity may send information on the location of the accessory device and designate the accessory device as near the owner device. For example, delegate or sub-delegate of the delegate entity may hand the accessory device 530 back to the owner and designate the accessory device as with the owner device and designate the accessory device 530 as near the owner.

Upon a determination that a set of conditions defined in metadata for the share are satisfied, a response for the location service access request is sent to the sharee device 504 (1608). The share resource locator includes the unique identifier that may be used to retrieve the share identifier associated with the share resource locator. The unique identifier may be used to look up and retrieve the share identifier to locate the share and/or corresponding delegate keys at the delegate server. The second share identifier may ensure that there is a level of indirection and the identifier within the resource locator is not the second identifier used to retrieve the share. The device locator server 530 fulfills the request with the delegate keys from the delegate server for the share and sends the encrypted location information to the sharee device 504 either directly 524, from a third-party server via a third party application, and/or from a delegate server 534. The sharee device 504 decrypts the location information using cryptographic keys generated with the delegate shared secrets within the browser or with third-party application.

FIG. 17 illustrates an embodiment of a delegation user interface on electronic device 2600 that enables an owner device 502 (or a sharee device) and/or a sharee device 504 to share location updates. FIGS. 17 and 18 are variants of the delegation user interface 503 described herein. The share resource locator 2602 for the share is displayed within the share summary user interface entitled "Share Location Updates." In some embodiments, the delegation user interface may be implemented as a web application that is executed within a browser. Embodiments may be implemented with an application server, such as delegate entity (e.g., third party server) web application server. Information on the share for the corresponding share resource locator 2602, as shown with "http://shareurl.com?param=1 #key," may be summarized within the user interface with a number of visitors, as shown with "Number of Visitors=3," to the share and an expiration date, as shown with "Feb. 14, 2024," 2604. User interface element "Share Link" 2606 allows the user to share a link using various communication methods as illustrated in an exemplary embodiment in FIG. 18. In an embodiment, the user enables the share by sending the share resource locator 2602. In another embodiment, the user is able to indicate in a setting whether to enable or disable the share corresponding to the share resource locator 2602. Alternatively, the user can disable the share with user interface element "Stop Share" 2608. User interface element 2610 allows the user to exit the web application, as shown with "Done."

FIG. 18 illustrates an embodiment of a delegation user interface on electronic device 2601 that enables an owner device 502 (or a delegate device) and/or a sharee device 504 to share the share resource locator. As illustrated in the user interface on the electronic device 2601, the user may send the share resource locator 2602 with various communication methods 2608 as shown with icons for file transfer application, text messaging application, and electronic mail. Those with skill in the art will recognize that the user may use any type of communication method, such as text messages, electronic mail, file transfer services, cloud services, note-taking applications (as shown with 2612), word processing application, text editors, saved to files (as shown with 2614), and/or synchronization. The user may use electronic device 2601 copy and paste functionality with the share resource locator 2602, as illustrated with user interface element 2610 "Copy Link." User interface element 2610 allows the user to exit the web application, as shown with "Done."

FIGS. 19A and 19B illustrate an exemplary embodiment of a delegation user interface on electronic device 2702. An authenticated sharee device 504 can access the device locator services with the share resource locator as illustrated with FIGS. 19A and 19B. FIGS. 19A and 19B are variants of Delegation UI 506 described herein. An error would be displayed if conditions were not met for the share of resource locator services, such as if the accessory device 530 was within beacon signal range of the owner device 502 or another sharee device 504. As shown in FIG. 19A, the device locator UI 2701 of a sharee device 504 can present a graphical user interface on electronic device 2702 with accessory device location 2704 for an accessory device associated with an item 2708 "House Keys" and location information is presented as shown with item "House Keys" located at 2706 within a map. The owner and sharee have an access policy in which the sharee is permitted to have location information for the item associated with accessory device 530 when the item has a device status of located not near the owner as illustrated. The sharee device 530 has device locator capabilities of "Play sound" 2710 and "Notifications" 2712 (provided in more detail in 2716 of FIG. 19B). As shown in FIG. 19B, the device locator UI 2701 of a sharee device 504 can present a graphical user interface on electronic device 2702 with accessory device location 2704 and the delegate designated as "Me" 2718 has device locator capabilities of "Play sound" 2710, "Notifications" 2712 (e.g., "Notify When Found," "Notify When Left Behind," "Notify When Moved"), and "Share Item" by selecting an affordance to "Add Person." As shown in FIG. 19B, the sharee "Me" 2718 is viewing share information on "House Keys" that is also shared with delegate "Sara Parker."

Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A method comprising:

receiving, by a delegate server, authentication credentials from a first sharee electronic device;

determining, by the delegate server, at least one cryptographic key and metadata accessible to a first sharee corresponding to the received authentication credentials, the metadata defining a set of conditions for a share of location information for an accessory device;

evaluating, by the delegate server, the metadata to determine if the set of conditions are satisfied;

upon determination that the set of conditions are satisfied, sending, by the delegate server, the metadata and the at least one cryptographic key to the first sharee electronic device;

receiving an indication that a second sharee electronic device associated with a second sharee is joining the share of location information for the accessory device; and after receiving the indication, sending, by the delegate server and to the first sharee device, at least one update for the cryptographic key and the metadata.

2. The method of claim 1, wherein the metadata comprises an access policy for access to the location information for the accessory device by the first sharee.

3. The method of claim 2, wherein the access policy comprises conditions for the first sharee on obtaining the location information provided to a device location server by the second sharee electronic device established upon acceptance of the share by the first sharee and the second sharee.

4. The method of claim 1, wherein the metadata comprises an account identifier for the first sharee and a duration of time for the share.

5. A method comprising:

sending, to a delegate server and from a second device, an affirmative response to a request to share access to location information for an accessory device in accordance with an access policy, the accessory device paired to an owner device;

receiving, from the delegate server, metadata and at least one cryptographic key, the metadata comprising the access policy;

sending, to a device location server, a request to perform a look up of location information for the accessory device with the at least one cryptographic key, the request comprising the metadata; and receiving encrypted location information and an encrypted cryptographic key for the encrypted location information for the accessory device in accordance with the access policy.

6. The method of claim 5, wherein the access policy comprises conditions on obtaining location information provided to the device location server by the second device established upon acceptance of the request to share by the second device.

7. A non-transitory machine-readable medium storing instructions to cause one or more processors of a delegate server to perform operations comprising:

receiving, by the delegate server, authentication credentials from a first sharee electronic device;

determining, by the delegate server, at least one cryptographic key and metadata accessible to a first sharee corresponding to the received authentication credentials, the metadata defining a set of conditions for a share of location information for an accessory device;

evaluating, by the delegate server, the metadata to determine if the set of conditions are satisfied;

upon determination that the set of conditions are satisfied, sending, by the delegate server, the metadata and the at least one cryptographic key to the first sharee electronic device;

receiving an indication that a second sharee electronic device associated with a second sharee is joining the share of location information for the accessory device; and after receiving the indication, sending, by the delegate server and to the first sharee electronic device, at least one update for the cryptographic key and the metadata.

8. The non-transitory machine-readable medium of claim 7, wherein the metadata comprises an access policy for access to the location information for the accessory device by the first sharee.

9. The non-transitory machine-readable medium of claim 8, wherein the access policy comprises conditions for the first sharee on obtaining the location information provided to a device location server by the second sharee electronic device established upon acceptance of the share by the first sharee and the second sharee.

10. The non-transitory machine-readable medium of claim 7, wherein the metadata comprises an account identifier for the first sharee and a duration of time for the share.

11. A data processing system comprising:

a memory to store instructions for execution; and one or more processors to execute the instructions stored in the memory, wherein the instructions, when executed cause the one or more processors to:

receive, by a delegate server, authentication credentials from a first sharee electronic device;

determine, by the delegate server, at least one cryptographic key and metadata accessible to a first sharee corresponding to the received authentication credentials, the metadata defining a set of conditions for a share of location information for an accessory device;

evaluate, by the delegate server, the metadata to determine if the set of conditions are satisfied;

upon determination that the set of conditions are satisfied, send, by the delegate server, the metadata and the at least one cryptographic key to the first sharee electronic device;

receive an indication that a second sharee electronic device associated with a second sharee is joining the share of location information for the accessory device; and after receiving the indication, send, by the delegate server and to the first sharee device, at least one update for the cryptographic key and the metadata.

12. The data processing system of claim 11, wherein the metadata comprises an access policy for access to the location information for the accessory device by the first sharee.

13. The data processing system of claim 12, wherein the access policy comprises conditions for the first sharee on obtaining the location information provided to a device location server by the second sharee electronic device established upon acceptance of the share by the first sharee and the second sharee.

14. The data processing system of claim 11, wherein the metadata comprises an account identifier for the first sharee and a duration of time for the share.

15. A non-transitory machine-readable medium storing instructions to cause one or more processors of a second electronic device to perform operations comprising:

sending, to a delegate server and from the second electronic device, an affirmative response to a request to share access to location information for an accessory device in accordance with an access policy, the accessory device paired to a first electronic device;

receiving, from the delegate server, metadata and at least one cryptographic key, the metadata comprising the access policy;

sending, to a device location server, a request to perform a look up of location information for the accessory device with the at least one cryptographic key, the request comprising the metadata; and receiving encrypted location information and an encrypted cryptographic key for the encrypted location information for the accessory device in accordance with the access policy.

16. The non-transitory machine-readable medium of claim 15, wherein the access policy comprises conditions on obtaining the location information provided to the device location server by the second electronic device established upon acceptance of the request to share by the second electronic device.

\* \* \* \* \*